US012693954B2

(12) United States Patent
Yang et al.

(10) Patent No.: US 12,693,954 B2
(45) Date of Patent: Jul. 28, 2026

(54) SERVICE DATA PROCESSING METHOD AND APPARATUS, COMPUTER DEVICE, AND STORAGE MEDIUM WITH IMPROVED ACCURACY BASED ON HISTORICAL SERVICE AND SCENARIO INFLUENCE VALUE DATA SEQUENCES

(71) Applicant: Tencent Technology (Shenzhen) Company Limited, Shenzhen (CN)

(72) Inventors: Fan Yang, Shenzhen (CN); Dongfang Nan, Shenzhen (CN); Fei Huang, Shenzhen (CN); Yanchun Lin, Shenzhen (CN); Weibiao Zhan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 775 days.

(21) Appl. No.: 17/986,312

(22) Filed: Nov. 14, 2022

(65) Prior Publication Data

US 2023/0082012 A1 Mar. 16, 2023

Related U.S. Application Data

(63) Continuation of application No. PCT/CN2022/092432, filed on May 12, 2022.

(30) Foreign Application Priority Data

Jun. 24, 2021 (CN) .......................... 202110704869.4

(51) Int. Cl.
*G06F 11/34* (2006.01)
*G06F 17/18* (2006.01)

(52) U.S. Cl.
CPC .......... *G06F 11/3409* (2013.01); *G06F 17/18* (2013.01)

(58) Field of Classification Search
CPC ................. G06F 11/3409; G06F 17/18; G06F 2201/865; G06F 11/302; G06F 11/345;
(Continued)

(56) References Cited

U.S. PATENT DOCUMENTS 7,580,878 B1 8/2009 Nieto
10,755,387 B2 * 8/2020 Jeffery ..................... G06T 7/11
(Continued)

FOREIGN PATENT DOCUMENTS

CN 110910169 A 3/2020
CN 111818066 A 10/2020

OTHER PUBLICATIONS

International Search Report for PCT/CN2022/092432 dated Jun. 29, 2022.
Written Opinion for PCT/CN2022/092432 dated Jun. 29, 2022.

*Primary Examiner* — Bradley A Teets
(74) *Attorney, Agent, or Firm* — Sughrue Mion, PLLC

(57) ABSTRACT

A service data processing method includes: acquiring a historical service data sequence of historical service data arranged in chronological order; determining a historical cycle to which the historical service data belongs, acquiring a reference service data sequence in a reference cycle corresponding to the historical cycle, and obtaining first comparative service data based on the reference service data sequence; acquiring a first service data difference between the historical service data and the first comparative service data; acquiring a reference data difference, and determining abnormal scenario influence values corresponding to the historical service data based on the first service data difference and the reference data difference; arranging the abnormal scenario influence values corresponding to the historical (Continued)

service data in chronological order to obtain a scenario influence value sequence; and determining target service data based on the historical service data sequence and the scenario influence value sequence.

20 Claims, 8 Drawing Sheets

(58) Field of Classification Search
CPC .... G06F 2123/02; G06Q 10/04; G06Q 30/02; G06Q 40/04; G06Q 20/38; G06Q 20/3829; G06Q 20/389
See application file for complete search history.

(56) References Cited

U.S. PATENT DOCUMENTS

| | | | |
|---|---|---|---|
| 2001/0037277 A1* | 11/2001 | Willis | G06Q 40/06 |
| | | | 705/36 R |
| 2015/0286516 A1* | 10/2015 | Chen | G06F 11/0751 |
| | | | 714/37 |
| 2015/0356678 A1* | 12/2015 | Schmitt | G06Q 40/06 |
| | | | 705/37 |
| 2016/0217407 A1 | 7/2016 | Ostanik | |
| 2019/0392252 A1* | 12/2019 | Fighel | G06F 17/18 |
| 2021/0026719 A1* | 1/2021 | Sghiouer | G06F 11/0751 |
| 2022/0198263 A1* | 6/2022 | Guo | G06Q 50/01 |
| 2022/0245045 A1* | 8/2022 | Ajiro | G06F 11/3476 |

* cited by examiner

Service data
processing

104

Service
data
analysis
request

Target
service
data

Network

Service
data
analysis
request

Target
service
data

102

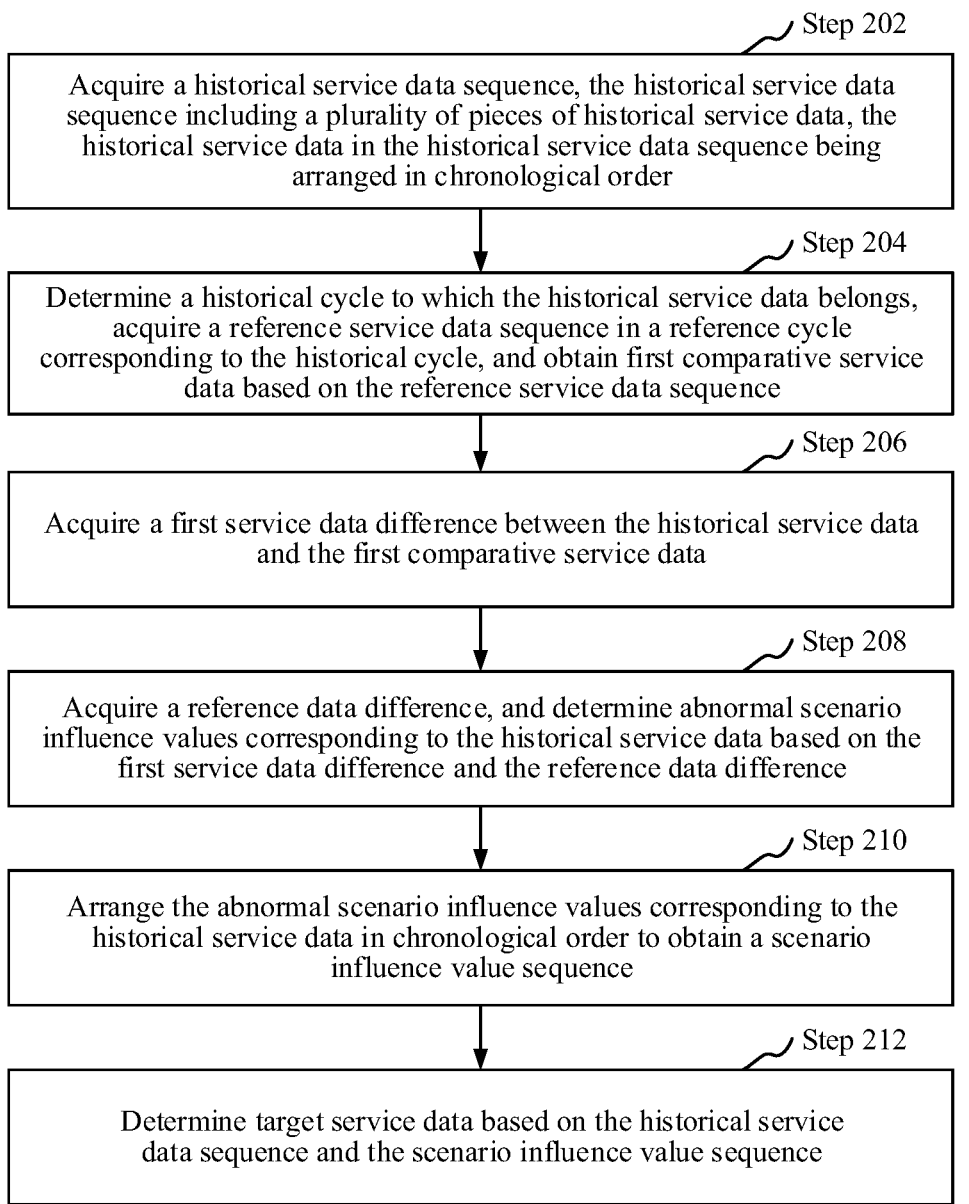

Step 202

Acquire a historical service data sequence, the historical service data sequence including a plurality of pieces of historical service data, the historical service data in the historical service data sequence being arranged in chronological order Step 204

Determine a historical cycle to which the historical service data belongs, acquire a reference service data sequence in a reference cycle corresponding to the historical cycle, and obtain first comparative service data based on the reference service data sequence Step 206

Acquire a first service data difference between the historical service data and the first comparative service data Step 208

Acquire a reference data difference, and determine abnormal scenario influence values corresponding to the historical service data based on the first service data difference and the reference data difference Step 210

Arrange the abnormal scenario influence values corresponding to the historical service data in chronological order to obtain a scenario influence value sequence Step 212

Determine target service data based on the historical service data sequence and the scenario influence value sequence

FIG. 2

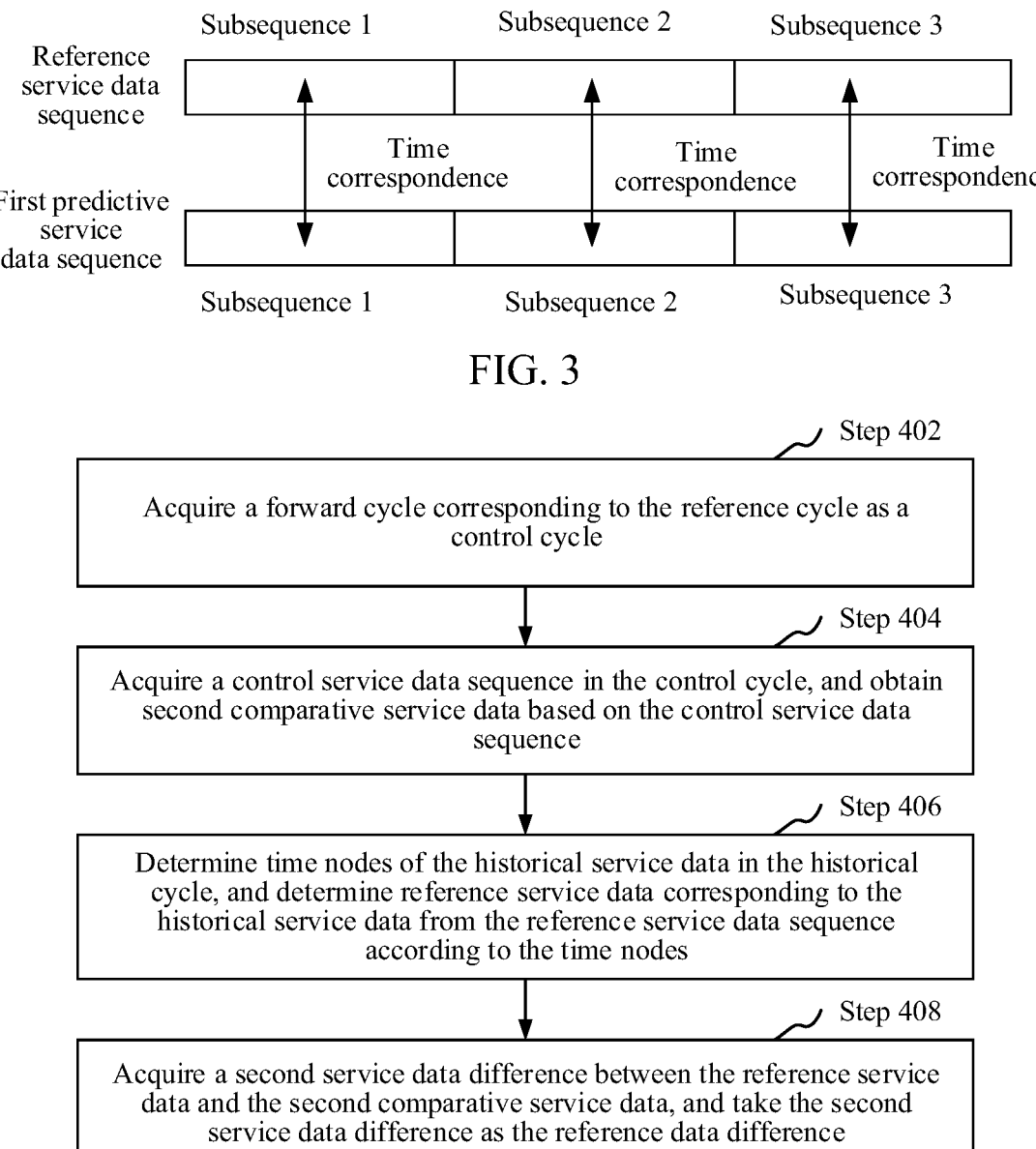

FIG. 3

Step 402

Acquire a forward cycle corresponding to the reference cycle as a control cycle

Step 404

Acquire a control service data sequence in the control cycle, and obtain second comparative service data based on the control service data sequence Step 406

Determine time nodes of the historical service data in the historical cycle, and determine reference service data corresponding to the historical service data from the reference service data sequence according to the time nodes Step 408

Acquire a second service data difference between the reference service data and the second comparative service data, and take the second service data difference as the reference data difference

FIG. 4

SERVICE DATA PROCESSING METHOD AND APPARATUS, COMPUTER DEVICE, AND STORAGE MEDIUM WITH IMPROVED ACCURACY BASED ON HISTORICAL SERVICE AND SCENARIO INFLUENCE VALUE DATA SEQUENCES

CROSS-REFERENCE TO RELATED APPLICATIONS

This application is a continuation application of International Application No. PCT/CN2022/092432, filed on May 12, 2022, which claims priority to Chinese Patent Application No. 202110704869.4, filed with the China National Intellectual Property Administration on Jun. 24, 2021, the disclosures of each of which being incorporated by reference herein in their entireties.

FIELD

The disclosure relates to the field of computer technologies, and in particular, to a service data processing method and apparatus, a computer device, and a storage medium.

BACKGROUND

With the development of the computer technologies, service data has increased in popularity. In many cases, there is a need to acquire the service data to determine service strategies according to the service data. For example, the service data may be resource transfer data. The resource transfer data may be simulated to reduce service risks associated with resource transfer.

In the conventional technology, historical service data may be acquired, and future service data is predicted based on the historical service data. However, in the conventional technology, a problem arises that the predicted service data has low accuracy.

SUMMARY

According to various embodiments, a service data processing method, performed by a computer device, may include acquiring a historical service data sequence including historical service data arranged in chronological order; determining a historical cycle to which the historical service data belongs, acquiring a reference service data sequence in a reference cycle corresponding to the historical cycle, and obtaining first comparative service data based on the reference service data sequence; acquiring a first service data difference between the historical service data and the first comparative service data; acquiring a reference data difference, and determining abnormal scenario influence values corresponding to the historical service data based on the first service data difference and the reference data difference; arranging the abnormal scenario influence values corresponding to the historical service data in chronological order to obtain a scenario influence value sequence; determining target service data based on the historical service data sequence and the scenario influence value sequence.

According to various embodiments, a service data processing apparatus, a computer device, a non-transitory computer-readable storage medium, and a computer program product consistent with the forgoing method may also be provided.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a schematic flowchart of a service data processing method according to some embodiments;

FIG. 3 is a schematic diagram of time correspondences according to some embodiments;

FIG. 4 is a schematic flowchart of acquiring reference difference data according to some embodiments;

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Figure 1:
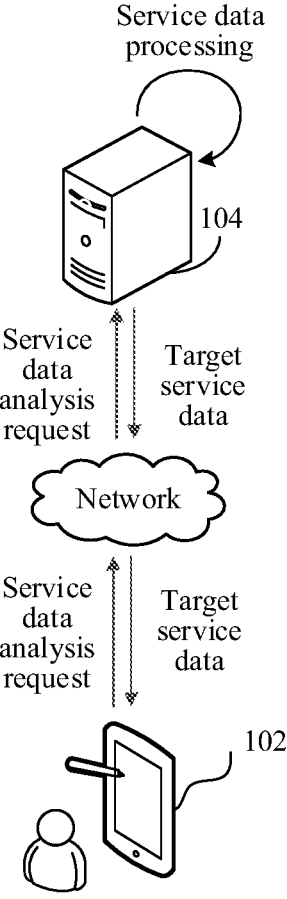
FIG. 1 is a diagram of an application environment of a service data processing method according to some embodiments.

FIG. 1 shows a diagram of an application environment of a service data processing method according to some embodiments. The application environment includes a terminal 102 and a server 104. The terminal 102 communicates with the server 104 through a network. The terminal 102 may transmit a service data analysis request to the server 104. The service data analysis request carries a historical cycle and a target time period. The server 104, after receiving the service data analysis request, acquires a historical service data sequence according to the historical cycle and performs service data analysis processing to predict target service data in the target time period. The target service data is returned to the terminal 102 over a network. The terminal 102 may be, but not limited to, a personal computer, a notebook computer, a smartphone, a tablet computer, and a portable wearable device. The server 104 may be implemented by an independent server or a server cluster including a plurality of servers.

In some embodiments, the server may determine a historical cycle to which historical service data belongs, acquire a reference service data sequence in a reference cycle corresponding to the historical cycle, obtain first comparative service data based on the reference service data sequence, acquire a first service data difference between the historical service data and the first comparative service data, acquire a reference data difference, determine abnormal scenario influence values corresponding to the historical service data based on the first service data difference and the reference data difference, arrange the abnormal scenario influence values corresponding to the historical service data in chronological order to obtain a scenario influence value sequence, and determine target service data based on the historical service data sequence and the scenario influence value sequence.

In some embodiments, a service data processing method is provided. The service data processing method may be applied to a computer device. The computer device may be a terminal or a server in FIG. 1, or an interactive system formed by a terminal and a server, which is realized through interaction between the terminal and the server. This embodiment is described by using an example in which the method is applied to a server. The method includes the following operations:

Operation 202: Acquire a historical service data sequence, the historical service data sequence including a plurality of pieces of historical service data, the historical service data in the historical service data sequence being arranged in chronological order.

The historical service data sequence is a time series. The time series is a sequence of data arranged in chronological order. The historical service data sequence includes a plurality of pieces of historical service data. The historical service data is arranged in chronological order. The historical service data refers to service data in a historical time period. The service data refers to data related to service scenarios. Different service scenarios correspond to different service data. The service data may be, for example, resource data. The resource data may be resource transfer data and resource holding data. The "resource" herein refers to resources that can be circulated, such as resources that can be circulated over the Internet through accounts. The "resource transfer" means transferring resources from one user's account to another user's account. The resource transfer data may be, for example, a transaction volume, a transaction amount, or the like. The resource holding data refers to a quantity of resources held by a target user, and the resource holding data may be, for example, financial holdings.

In some embodiments, the computer device may receive a plurality of pieces of historical service data transmitted by the terminal, and arrange the historical service data in chronological order to obtain a historical service data sequence. In some embodiments, the computer device may acquire historical service data in different time nodes from a database, and arrange the historical service data in chronological order to obtain a historical service data sequence. It may be understood that the historical service data in the historical service data sequence corresponds to different time nodes. According to different observation time, the time nodes herein may be one of a year, a quarter, a month, a week, a day, a specific moment, and any other form of time.

For example, assuming that a transaction volume of a commodity in the past week is $X1$ on the first day, $X2$ on the second day, $X3$ on the third day, $X4$ on the fourth day, $X5$ on the fifth day, $X6$ on the sixth day, and $X7$ on the seventh day, $X1$, $X2$, $X3$, $X4$, $X5$, $X6$, and $X7$ may form a time series $\{X1, X2, X3, X4, X5, X6, X7\}$.

Operation 204: Determine a historical cycle to which the historical service data belongs, acquire a reference service data sequence in a reference cycle corresponding to the historical cycle, and obtain first comparative service data based on the reference service data sequence.

Due to periodicity of time, a sequence arranged in chronological order is generally periodic. A cycle corresponding to service data may be set as required. The cycle may be, for example, a week, a month, or a year. The historical cycle to which the historical service data belongs refers to a time cycle to which the historical service data belongs. The reference cycle corresponding to the historical cycle is a forward cycle corresponding to the historical cycle. For example, the reference cycle may be a previous time cycle of the historical cycle, a cycle before last of the historical cycle, or the like. The reference service data sequence of the reference cycle refers to a sequence of service data arranged in chronological order in the reference cycle. The service data in the reference cycle may be referred to as reference service data. The first comparative service data is used for comparison with the historical service data to determine abnormal scenario influence values of the historical service data.

In some embodiments, for the historical service data in the historical service data sequence, the computer device may determine a time cycle to which the historical service data belongs as the historical cycle, determine the reference cycle from the forward cycle of the historical cycle, acquire service data in the reference cycle, and obtain the reference service data sequence. The computer device may obtain the first comparative service data based on the reference service data sequence.

In some embodiments, the computer device may determine time nodes to which the historical service data belongs, and determine reference service data acquired from the reference service data sequence and corresponding to the time nodes as the first comparative service data.

In some other embodiments, the computer device may determine a reference service data subsequence from the reference service data sequence, and conduct statistics on service data in the reference service data subsequence to obtain the first comparative service data. The "conduct statistics" herein may mean calculating an average value, calculating a median, or the like.

Operation 206: Acquire a first service data difference between the historical service data and the first comparative service data.

The first service data difference is used for reflecting a degree of variation of the historical service data with respect to the first comparative service data. The first service data difference is positively correlated with the degree of variation of the historical service data with respect to the first comparative service data. The first service data difference may be a difference between the historical service data and the first comparative service data.

In some embodiments, the computer device may subtract the first comparative service data from the historical service data to obtain the first service data difference.

Operation 208: Acquire a reference data difference, and determine abnormal scenario influence values corresponding to the historical service data based on the first service data difference and the reference data difference.

The reference data difference refers to data used for referring to the first service data difference between the historical service data and the first comparative service data. The reference data difference may be data set based on experience, or the reference data difference may be obtained according to a difference between the service data in the reference cycle and service data in a forward cycle of the reference cycle.

The abnormal scenario influence values are used for reflecting degrees of influence of an abnormal scenario on the historical service data. The greater the abnormal scenario influence value, the greater the influence of the abnormal scenario on the historical service data. The abnormal scenario refers to an unexpected scenario that occurs during normal development of a current service scenario. For example, when the service data is a transaction volume, the abnormal scenario may be, for example, a large-scale disease outbreak scenario. In the large-scale disease outbreak scenario, a sustained decline in a transaction volume of goods below a "normal trend" of a service data sequence predicted according to historical trends is an abnormal scenario. The abnormal scenario may also be an anomaly in a time series caused by some special circumstances. For example, when underlying logic of a service changes, a sudden change may occur and may last for a long time, which may also be considered as an abnormal scenario.

In some embodiments, the computer device first acquires a reference data difference, and then acquires a relative degree of variation of the first service data difference with respect to the reference data difference based on the first service data difference and the reference data difference, to obtain the abnormal scenario influence values corresponding to the historical service data.

In some embodiments, the computer device may determine a difference between the first service data difference and the reference data difference as an abnormal scenario influence value corresponding to the historical service data. For example, assuming that the first service data difference is X1 and the reference data difference is X2, the abnormal scenario influence value may be |X1−X2|. In some other embodiments, the computer device may determine a ratio of the first service data difference to the reference data difference as an abnormal scenario influence value corresponding to the historical service data. For example, assuming that the first service data difference is X1 and the reference data difference is X2, the abnormal scenario influence value may be X1/X2.

Operation 210: Arrange the abnormal scenario influence values corresponding to the historical service data in chronological order to obtain a scenario influence value sequence.

In some embodiments, for each piece of historical service data in the historical service data sequence, the computer device may obtain an abnormal scenario influence value corresponding to the historical service data, and arrange the abnormal scenario influence values in chronological order to obtain the scenario influence value sequence.

In some embodiments, for each piece of historical service data in the historical service data sequence, the computer device may obtain the abnormal scenario influence value corresponding to the historical service data according to operation 204 to operation 208, and arrange the abnormal scenario influence values in chronological order of the corresponding historical service data to obtain the scenario influence value sequence.

In some other embodiments, the computer device may determine an abnormal service data subsequence and a non-abnormal service data subsequence from the historical service data sequence, obtain abnormal scenario influence values respectively corresponding to historical service data in the abnormal service data subsequence according to operation 204 to operation 208, and set historical service data in the non-abnormal service data subsequence to a preset value. The preset value may be 0.

Operation 212: Determine target service data based on the historical service data sequence and the scenario influence value sequence.

The target service data refers to service data in future time. The target service data may be service data at a specific point in time in the future, or a time series of a plurality of pieces of service data arranged in chronological order.

In some embodiments, the computer device, after obtaining the scenario influence value sequence, may take the scenario influence value sequence as a feature, and input the feature into a service data prediction model together with a feature extracted based on the historical service data sequence. The target service data is predicted through the service data prediction model. It should be noted that the service data prediction model is a machine learning model for predicting a time series. The service data prediction model may be a prophet model, an xbgoost model, a long short-term memory (LSTM) model, or the like.

Taking the prophet model as an example, the prophet model in the related art is expressed as the following formula (1):

$$f(t)=g(t)+s(t)+h(t)+x(t)+\varepsilon(t) \tag{1}$$

where f(t) denotes predicted target service data, g(t) denotes a trend term, s(t) denotes a periodic term, h(t) denotes a holiday term, x(t) denotes a feature term, and £(t) denotes a residual term.

With the service data processing method according to some embodiments, the scenario influence value sequence is inputted to the prophet model as a feature to obtain the following formula (2), where l(t) denotes a scenario influence value sequence term:

$$f(t)=g(t)+s(t)+h(t)+x(t)+\varepsilon(t)+l(t) \tag{2}$$

In some embodiments, the obtained abnormal scenario influence values may greatly fluctuate. In order to improve prediction accuracy, the computer device, after obtaining the scenario influence value sequence, may smooth the abnormal scenario influence values in the scenario influence value sequence, for example, by a piecewise function, second-order regression, third-order regression, a spline method, or the like.

In some embodiments, the computer device, after obtaining the target service data, may encrypt the target service data based on a preset key generation method, and transmit encrypted target service data to the terminal. The preset key generation method may be at least one of a hash algorithm, a symmetric encryption algorithm, and an asymmetric encryption algorithm.

In some embodiments, a same key generation method may be preset in the terminal and the computer device. The computer device may generate a key based on the scenario influence value sequence and the preset key generation method. The key is a symmetric key. The computer device encrypts the target service data through the symmetric key and then transmits the scenario influence value sequence and the target service data to the terminal. The terminal, after receiving the target service data, also generates a key based on the target service data and the same preset key generation method, and performs decryption with the key. If the decryption is successful, it is determined that the target service data is correct.

In the above service data processing method, the target service data is predicted by determining a historical cycle to which historical service data in a historical service data sequence belongs, acquiring a reference service data sequence in a reference cycle corresponding to the historical cycle, obtaining first comparative service data based on the reference service data sequence, acquiring a first service data difference between the historical service data and the first comparative service data, acquiring a reference data difference, determining abnormal scenario influence values corresponding to the historical service data based on the first service data difference and the reference data difference, arranging the abnormal scenario influence values corresponding to the historical service data in chronological order to obtain a scenario influence value sequence, and determining the target service data based on the historical service data sequence and the scenario influence value sequence. The scenario influence value sequence may assess influence of an abnormal scenario on the service data and reflect a degree of influence of the abnormal scenario on the service data. Therefore, in the determination of the target service data, the influence of the historical service data sequence and the abnormal scenario on the service data may be comprehensively considered, which improves accuracy of prediction of the target service data.

In some embodiments, the acquiring a reference service data sequence in a reference cycle corresponding to the historical cycle, and obtaining first comparative service data based on the reference service data sequence includes: acquiring the reference service data sequence corresponding to the reference cycle, and segmenting the reference service data sequence to obtain a plurality of reference service data subsequences; acquiring, from the plurality of reference service data subsequences, the reference service data subsequence whose prediction accuracy meets an accuracy condition as a target subsequence; and conducting statistics on reference service data in the target subsequence, and obtaining the first comparative service data based on statistical results.

The segmenting the reference service data sequence refers to a process of extracting a plurality of pieces of time-continuous reference service data from the reference service data sequence. The plurality of pieces of reference service data extracted are arranged in chronological order to obtain the reference service data subsequence. The prediction accuracy refers to accuracy of prediction of service data in a future time period based on a historical transformation law of the service data. The accuracy condition refers to a condition that is set as required and can determine the prediction accuracy. The accuracy condition may be, for example, the prediction accuracy being greater than an accuracy threshold or the prediction accuracy being sorted before a sorting threshold. The prediction accuracy being sorted before the sorting threshold may specifically mean that, when all prediction accuracy is sorted in descending order, the prediction accuracy that meets the accuracy condition is sorted first, that is, maximum accuracy.

In some embodiments, the computer device, after acquiring the reference service data sequence corresponding to the reference cycle, may segment the reference service data sequence according to a target manner to obtain a plurality of reference service data subsequences. The computer device may further acquire prediction accuracy of the reference service data subsequences, determine whether the prediction accuracy meets the accuracy condition, take the reference service data subsequence meeting the accuracy condition as the target subsequence, conduct statistics on all reference service data in the target subsequence, and obtain the first comparative service data based on the statistical results.

In some embodiments, the computer device segments the reference service data sequence, which may specifically be segmenting the reference service data sequence according to a time period. For example, it is assumed that the reference service data sequence is a time series obtained by arrangement of reference service data within three months. The reference service data sequence may be segmented into three reference service data subsequences on a monthly basis.

In some other embodiments, the segmenting, by the computer device, the reference service data sequence may specifically involve: acquiring a target time window, sliding the target time window on the reference service data sequence by taking a time node as a sliding unit, making reference service data in the target time window form the reference service data subsequences in chronological order, sliding the target time window on a predictive service data sequence by taking a time node as a sliding unit, and making predictive service data in the target time window form predictive service data subsequences in chronological order. The time node refers to a minimum time unit in a time cycle. Each piece of service data in the time cycle corresponds to a time node. By sliding the time window to obtain the reference service data subsequences, the reference service data subsequence that meets the accuracy condition can be accurately extracted from the reference service data sequence.

In some embodiments, the conducting statistics on reference service data in the target subsequence, and obtaining the first comparative service data based on statistical results may specifically involve: summing, by the computer device, all reference service data in the target subsequence, calculating an average value, and taking the obtained average value as the first comparative service data.

In the above embodiment, since the target subsequence is the reference service data subsequence whose prediction accuracy meets the accuracy condition and statistical results obtained by conducting statistics on reference service data in the target subsequence can accurately reflect overall data characteristics of the reference service data in the reference cycle, the first comparative service data obtained based on the statistical results can be better used for determining abnormal changes in service data in the historical cycle.

In some embodiments, the acquiring, from the plurality of reference service data subsequences, the reference service data subsequence whose prediction accuracy meets an accuracy condition as a target subsequence includes: acquiring a first predictive service data sequence corresponding to the reference service data sequence; segmenting the first predictive service data sequence to obtain first predictive service data subsequences; acquiring differences between the reference service data subsequences and the first predictive service data subsequences having a time correspondence as first subsequence differences; and acquiring, from the plurality of reference service data subsequences based on the first subsequence differences, the reference service data subsequence whose prediction accuracy meets the accuracy condition as the target subsequence.

The first predictive service data sequence refers to a service data sequence predicted through a prediction model. The first predictive service data sequence corresponding to the reference service data sequence means that the first predictive service data sequence and the reference service data sequence correspond to a same time period. The first predictive service data subsequence having a time correspondence means that a time period corresponding to the first predictive service data subsequence in the time cycle corresponds to a time period corresponding to the reference service data subsequence in the time cycle. That is, service data in the first predictive service data subsequence and service data in the reference service data subsequence correspond to a same time node.

In some embodiments, the computer device may acquire service data preceding the reference service data sequence as historical service data corresponding to the reference service data sequence, predict service data in a corresponding time period of the reference service data sequence based on a time series formed by the historical service data and a trained prediction model to obtain the first predictive service data sequence, then segment the first predictive service data sequence to obtain a plurality of first predictive service data subsequences, and acquire differences between the reference service data subsequences and the first predictive service data subsequences having a time correspondence to obtain corresponding first subsequence differences. The first subsequence differences are used for reflecting degrees of differences between the reference service data subsequences and the first predictive service data subsequences having a time correspondence. The smaller the degree of difference, the more accurate the prediction of the first predictive service data subsequence.

In some embodiments, the computer device, after obtaining the first subsequence differences corresponding to the reference service data subsequences, selects the reference service data subsequence with a minimum first subsequence difference, determines that prediction accuracy of the reference service data subsequence meets the accuracy condition, and takes the reference service data subsequence whose prediction accuracy meets the accuracy condition as the target subsequence.

In some embodiments, the reference service data sequence and the first predictive service data sequence are generally segmented in a same manner, and the reference service data subsequences and the first predictive service data subsequences having a time correspondence are subsequences sorted the same. For example, as shown in FIG. 3, assuming that the reference service data sequence is segmented to obtain three reference service data subsequences which are respectively a subsequence 1, a subsequence 2, and a subsequence 3 in chronological order and the first predictive service data sequence is segmented to obtain three first predictive service data subsequences which are respectively a subsequence 1, a subsequence 2, and a subsequence 3 in chronological order, a time correspondence exists between the subsequence 1 in the reference service data sequence and the subsequence 1 in the first predictive service data sequence, a time correspondence exists between the subsequence 2 in the reference service data sequence and the subsequence 2 in the first predictive service data sequence, and a time correspondence exists between the subsequence 3 in the reference service data sequence and the subsequence 3 in the first predictive service data sequence.

In some embodiments, the acquiring, by the computer device, differences between the reference service data subsequences and the first predictive service data subsequences having a time correspondence may specifically involve: calculating differences between service data in the reference service data subsequences and the first predictive service data subsequences under same time nodes, and summing and averaging all the differences, to obtain the differences between the reference service data subsequences and the first predictive service data subsequences.

In the above embodiment, the target subsequence can be quickly obtained by acquiring and segmenting the first predictive service data sequence, acquiring differences between the reference service data subsequences and the first predictive service data subsequences having a time correspondence as first subsequence differences, and obtaining the target subsequence based on the first subsequence differences.

In some embodiments, as shown in FIG. 4, the acquiring a reference data difference includes the following operations:

Operation 402: Acquire a forward cycle corresponding to the reference cycle as a control cycle.

Operation 404: Acquire a control service data sequence in the control cycle, and obtain second comparative service data based on the control service data sequence.

The forward cycle corresponding to the reference cycle refers to a cycle before the time corresponding to the reference cycle. The forward cycle corresponding to the reference cycle may be a previous time cycle of the reference cycle, a cycle before last of the reference cycle, or the like. The control service data sequence in the control cycle refers to a time series formed by service data in the control cycle. The service data in the control cycle is referred to as control service data.

In some embodiments, the computer device may acquire the forward cycle corresponding to the reference cycle, take the forward cycle as the control cycle corresponding to the reference cycle, acquire the control service data in the control cycle, arrange the control service data in chronological order to obtain the control service data sequence, and obtain the second comparative service data based on the control service data sequence.

In some embodiments, the computer device may determine time nodes to which the historical service data belongs, and determine control service data acquired from the control service data sequence and corresponding to the time nodes as the second comparative service data.

In some other embodiments, the computer device may determine a control service data subsequence from the control service data sequence, and obtain the second comparative service data based on the determined control service data subsequence.

In some specific embodiments, the acquiring a control service data sequence in the control cycle, and obtaining second comparative service data based on the control service data sequence includes: acquiring a target time period corresponding to the first comparative service data, and determining a control service data subsequence corresponding to the target time period from the control service data sequence; and conducting statistics on control service data in the control service data subsequence, and obtaining the second comparative service data based on statistical results. The "conduct statistics" herein may mean calculating an average value, calculating a median, or the like.

The first comparative service data is obtained by determining the reference service data subsequence from the reference service data sequence and conducting statistics on service data in the reference service data subsequence. The target time period corresponding to the first comparative service data is a time period to which the reference service data subsequence belongs. The control service data subsequence corresponding to the target time period means that a time period of the control service data subsequence in the time cycle corresponds to the target time period.

In some embodiments, a time interval between the historical cycle and the reference cycle is the same as a time interval between the reference cycle and the control cycle. For example, the reference cycle is a previous time cycle of the historical cycle, and the control cycle is the previous time cycle of the reference cycle. In another example, the reference cycle is a time cycle before last of the historical cycle, and the control cycle is a time cycle before last of the reference cycle.

In some embodiments, the acquiring, by the computer device, a control service data sequence in the control cycle, and obtaining second comparative service data based on the control service data sequence includes: acquiring the control service data sequence corresponding to the control cycle, and segmenting the control service data sequence to obtain a plurality of control service data subsequences; acquiring, from the plurality of control service data subsequences, the control service data subsequence whose prediction accuracy meets an accuracy condition as a target subsequence; conducting statistics on control service data in the target subsequence, and obtaining the second comparative service data based on statistical results.

In some embodiments, the acquiring, from the plurality of control service data subsequences, the control service data subsequence whose prediction accuracy meets an accuracy condition as a target subsequence may specifically include: acquiring a first predictive service data sequence corresponding to the control service data sequence; segmenting the first predictive service data sequence to obtain first predictive service data subsequences; acquiring differences between the control service data subsequences and the first predictive service data subsequence having a time correspondences as first subsequence differences; and acquiring, from the plurality of control service data subsequences based on the first subsequence differences, the control service data subsequence whose prediction accuracy meets the accuracy condition as the target subsequence.

In some embodiments, the computer device determines the reference service data subsequences from the reference service data sequence, calculates an average value of reference service data in the reference service data subsequences to obtain the first comparative service data, determines the control service data subsequences from the control service data sequence, and calculates an average value of control service data in the control service data subsequences to obtain the second comparative service data. A time correspondence exists between the reference service data subsequences determined from the reference service data sequence and the control service data subsequences determined from the control service data sequence.

Operation 406: Determine time nodes of the historical service data in the historical cycle, and determine reference service data corresponding to the historical service data from the reference service data sequence according to the time nodes.

The time node refers to a time unit in a time cycle. Each piece of service data in the time cycle corresponds to a time node. For example, assuming that the time cycle is one month, one day may be a time node.

In some embodiments, the computer device may determine the time nodes of the historical service data in the historical cycle according to the sorting of the historical service data in the historical service data sequence, and determine reference service data under the time nodes from the reference service data sequence as the reference service data corresponding to the historical service data.

Operation 408: Acquire a second service data difference between the reference service data and the second comparative service data, and take the second service data difference as the reference data difference.

The second service data difference is used for reflecting a degree of variation of the reference service data corresponding to the historical service data with respect to the second comparative service data. The second service data difference is positively correlated with the degree of variation of the reference service data corresponding to the historical service data with respect to the second comparative service data. The second service data difference may specifically be a difference between the reference service data corresponding to the historical service data and the second comparative service data.

In some embodiments, the computer device may subtract the second comparative service data from the reference service data corresponding to the historical service data to obtain the second service data difference, and take the second service data difference as the reference data difference.

Figure 5:
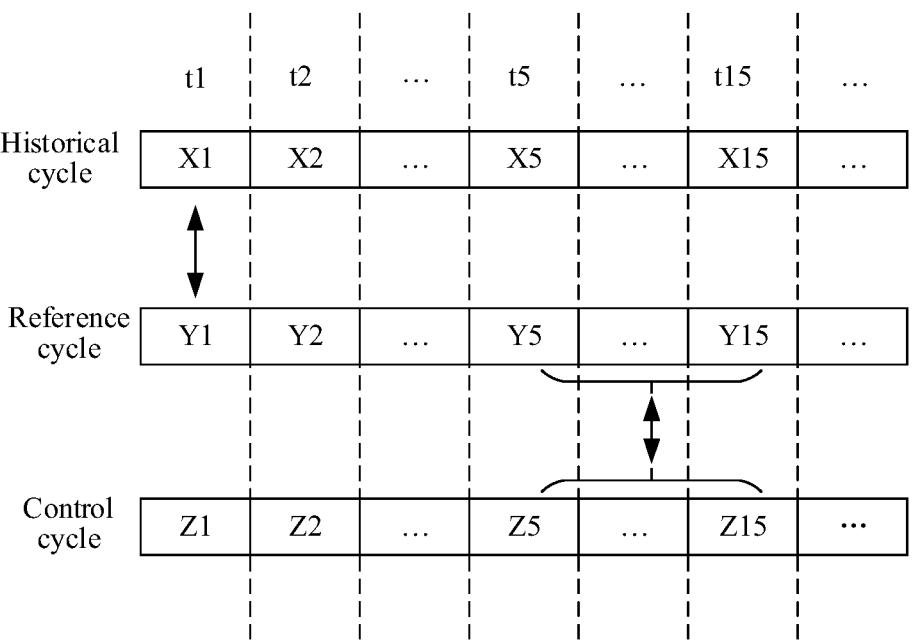
FIG. 5 is a schematic diagram of a process of acquiring reference difference data according to some embodiments.

For example, refer to FIG. 5 which is a schematic diagram of a process of acquiring reference difference data according to some embodiments. Assuming that a time node of historical service data X1 in the historical cycle is t1, reference service data corresponding to the historical service data in the reference cycle is Y1. Assuming that the first comparative service data is obtained from an average value of a reference service data subsequence $\{Y5, \ldots, Y15\}$ in a time period corresponding to t5 to t15 in a reference cycle, the second comparative service data may be obtained based on an average value of a reference service data subsequence $\{Z5, \ldots, Z15\}$ in a time period corresponding to t5 to t15 in a control cycle, so that reference difference data corresponding to the historical service data X1 may be Y1 which is the second comparative service data obtained based on the average value of $\{Z5, \ldots, Z15\}$.

In the above embodiment, since the second service data difference is used as the reference data difference and the second service data difference is obtained from the reference service data under same time nodes as the historical service data and the second comparative service data, the reference data difference can better reflect a normal change law of a service sequence, and abnormal influence values obtained based on the reference data difference can accurately reflect influence of an abnormal scenarios on service data.

In some embodiments, the determining abnormal scenario influence values corresponding to the historical service data based on the first service data difference and the reference data difference includes: determining a first degree of variation of the historical service data with respect to the first comparative service data based on the first service data difference and the first comparative service data; determining a second degree of variation of the reference service data with respect to the second comparative service data based on the reference data difference and the second comparative service data; and determining a relative degree of variation based on the first degree of variation and the second degree of variation, and determining the abnormal scenario influence values corresponding to the historical service data based on the relative degree of variation.

Specifically, the computer device may acquire a first ratio of the first service data difference to the first comparative service data, take the first ratio as the first degree of variation of the historical service data with respect to the first comparative service data, acquire a second ratio of the reference data difference to the second comparative service data, take the second ratio as the second degree of variation of the reference service data with respect to the second comparative service data, determine the relative degree of variation based on the first degree of variation and the second degree of variation, and determine the abnormal scenario influence values corresponding to the historical service data based on the relative degree of variation.

For example, assuming that the first service data difference is A1 and the first comparative service data is X1, the first degree of variation is A1/X1. Assuming that the reference data difference is A2 and the second comparative service data is X2, the second degree of variation is A2/X2.

In some embodiments, the determining a relative degree of variation based on the first degree of variation and the second degree of variation includes: acquiring a difference between the first degree of variation and the second degree of variation, and taking the difference as the relative degree of variation; or acquiring a ratio of the first degree of variation to the second degree of variation, and taking the ratio as the relative degree of variation.

In some embodiments, the determining abnormal scenario influence values corresponding to the historical service data based on the first service data difference and the reference data difference includes: determining initial abnormal scenario influence values corresponding to the historical service data based on the first service data difference and the reference data difference; and determining scenario influence value ranges to which the initial abnormal scenario influence values belongs, and taking abnormal scenario influence values corresponding to the scenario influence value ranges as the abnormal scenario influence values corresponding to the historical service data, the abnormal scenario influence values being positively correlated with values corresponding to the scenario influence value ranges.

The abnormal scenario influence values are positively correlated with values corresponding to the scenario influence value ranges. The greater the value of the scenario influence value range, the greater the abnormal scenario influence value.

In some embodiments, different scenario influence value ranges may be pre-classified. A corresponding abnormal scenario influence value is set for each scenario influence value range. The computer device, after determining the initial abnormal scenario influence values corresponding to the historical service data based on the first service data difference and the reference data difference, may determine the scenario influence value ranges to which the initial abnormal scenario influence values belong, and take abnormal scenario influence values corresponding to the scenario influence value ranges as the abnormal scenario influence values corresponding to the historical service data.

For example, assuming that the classified scenario influence value ranges are (a, b) and (b, c), a correspondence is established between the range (a, b) and an abnormal scenario influence value X, and a correspondence is established between the range (b, c) and an abnormal scenario influence value Y, if the computer device determines, based on the first service data difference and the reference data difference, that an initial abnormal scenario influence value corresponding to the historical service data is V and a<V<b, it may be determined that the abnormal scenario influence value is X.

In the above embodiment, the initial abnormal scenario influence values can be smoothed by determining the scenario influence value ranges to which the initial abnormal scenario influence values belong and taking abnormal scenario influence values corresponding to the scenario influence value ranges as the abnormal scenario influence values corresponding to the historical service data. When the smoothed abnormal scenario influence values are used for predicting the target service data, a prediction result is more accurate.

Figure 6:
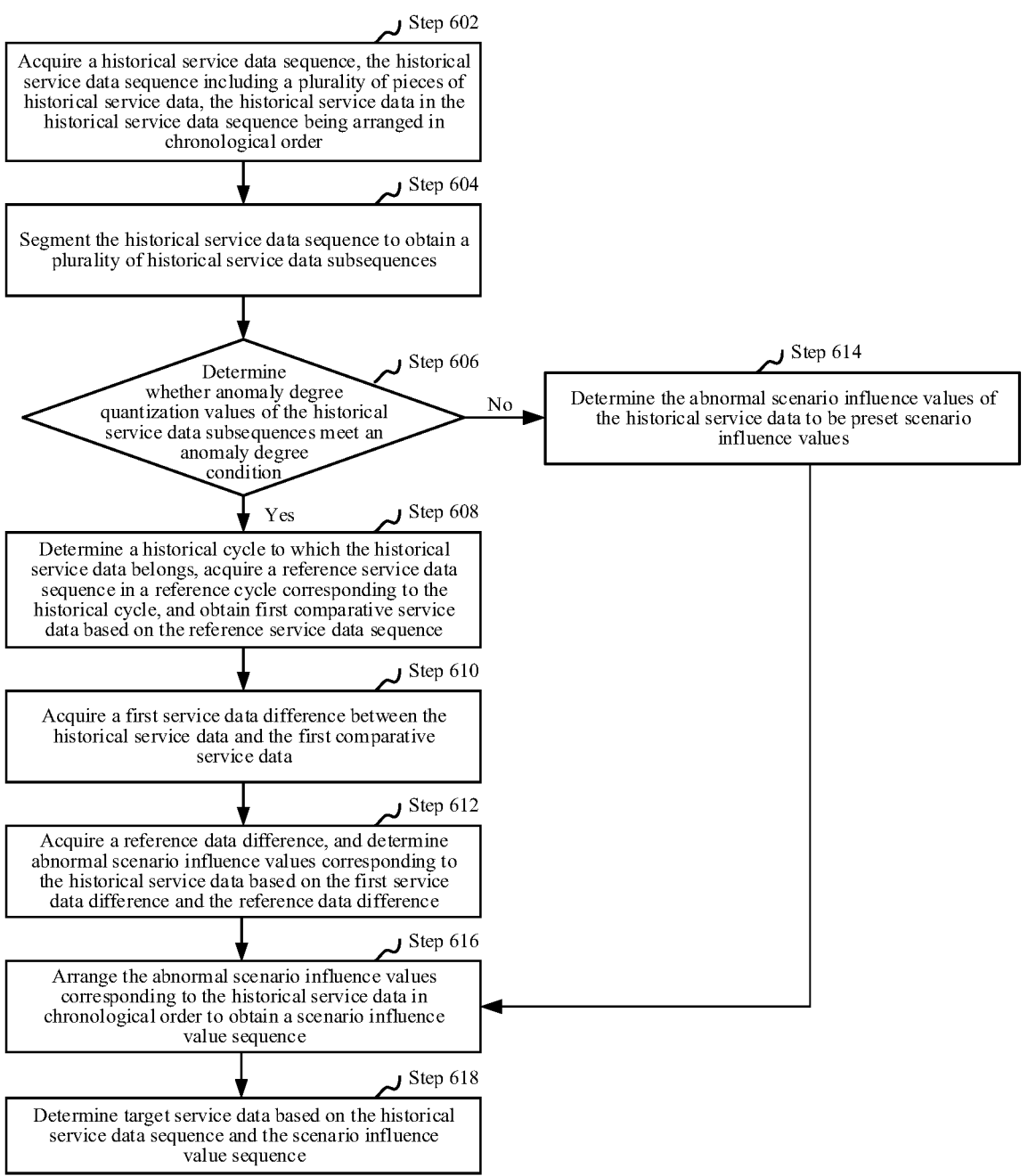
FIG. 6 is a schematic flowchart of a service data processing method according to some embodiments.

In some embodiments, as shown in FIG. 6, a service data processing method is provided, including the following operations:

Operation 602: Acquire a historical service data sequence, the historical service data sequence including a plurality of pieces of historical service data, the historical service data in the historical service data sequence being arranged in chronological order.

Operation 604: Segment the historical service data sequence to obtain a plurality of historical service data subsequences.

In some embodiments, the computer device segments the historical service data sequence, which may specifically be segmenting the historical service data sequence according to a time period. For example, it is assumed that the historical service data sequence is a time series obtained by arrangement of historical service data within three months. The historical service data sequence may be segmented into three historical service data subsequences on a monthly basis.

In some other embodiments, the segmenting, by the computer device, the historical service data sequence may specifically involve: acquiring a target time window, sliding the target time window on the historical service data sequence by taking a time node as a sliding unit, making historical service data in the target time window form the historical service data subsequences in chronological order, sliding the target time window on a predictive service data sequence by taking a time node as a sliding unit, and making predictive service data in the target time window form predictive service data subsequences in chronological order. The time node refers to a minimum time unit in a cycle. Each piece of service data in the cycle corresponds to a time node. By sliding the time window to obtain the historical service data subsequences, the historical service data subsequence that meets the accuracy condition can be accurately extracted from the historical service data sequence.

Operation 606: Determine whether anomaly degree quantization values of the historical service data subsequences meet an anomaly degree condition, and perform operation 608 if yes. Operation 614 is performed if not.

The anomaly degree quantization values are used for reflecting anomaly degrees of the historical service data subsequences. The anomaly degree condition refers to a condition that is set as required and can determine anomaly degrees. The anomaly degree condition may be, for example, an anomaly degree quantization value being greater than an anomaly degree quantization threshold.

In some embodiments, for each historical service data subsequence, when an anomaly degree of the historical service data subsequence meets the anomaly degree condition, it indicates that a time period corresponding to the historical service data subsequence is an abnormal scenario time period, and influence of an abnormal scenario on service data can be acquired in the abnormal scenario time period. Therefore, operation 608 can be performed. When the anomaly degree of the historical service data subsequence does not meet the anomaly degree condition, it indicates that the time period corresponding to the historical service data subsequence is a non-abnormal scenario time period, and the influence of the abnormal scenario on service data is little in the non-abnormal scenario time period and can be ignored. Therefore, the computer device can directly determine an abnormal scenario influence value of the service data in the non-abnormal scenario time period as a preset scenario influence value. The preset scenario influence value is a small value.

Operation 608: Determine a historical cycle to which the historical service data belongs, acquire a reference service data sequence in a reference cycle corresponding to the historical cycle, and obtain first comparative service data based on the reference service data sequence.

In some embodiments, for a historical service data subsequence meeting the anomaly degree condition, the computer device determines a historical cycle to which each piece of historical service data in the historical service data subsequence belongs, acquires a reference service data sequence in a reference cycle corresponding to each historical cycle, and obtains first comparative service data corresponding to each piece of historical service data based on the reference service data sequence.

Operation 610: Acquire a first service data difference between the historical service data and the first comparative service data.

Operation 612: Acquire a reference data difference, and determine abnormal scenario influence values corresponding to the historical service data based on the first service data difference and the reference data difference.

It may be understood that related descriptions of operation 608 to operation 612 may be obtained with reference to the descriptions in the above embodiments. Details are not described herein.

Operation 614: Determine the abnormal scenario influence values of the historical service data as preset scenario influence values.

The preset scenario influence values are less than the abnormal scenario influence values obtained based on the first service data difference and the reference data difference.

In some embodiments, for a historical service data subsequence not meeting the anomaly degree condition, the computer device determines an abnormal scenario influence value of each piece of historical service data in the historical service data subsequence as a preset scenario influence value. The abnormal scenario influence values of the historical service data may be determined to be same preset scenario influence values. For example, the computer device may determine the abnormal scenario influence values of the historical service data to be 0. Certainly, the abnormal scenario influence values of the historical service data may also be determined to be different preset scenario influence values. Moreover, the greater the abnormal scenario influence value, the greater the preset scenario influence value.

Operation 616: Arrange the abnormal scenario influence values corresponding to the historical service data in chronological order to obtain a scenario influence value sequence.

In some embodiments, the computer device arranges all the abnormal scenario influence values in chronological order to obtain the scenario influence value sequence.

Operation 618: Determine target service data based on the historical service data sequence and the scenario influence value sequence.

In the above embodiment, the abnormal scenario influence values of the service data in the historical service data subsequences not meeting the anomaly degree condition are determined to be the preset scenario influence values, which can reduce an amount of subsequent calculation to determine the abnormal scenario influence values and improve efficiency of prediction of the target service data.

In some embodiments, the acquiring, from the plurality of historical service data subsequences, the historical service data subsequence whose anomaly degree quantization value meets an anomaly degree condition as an abnormal service data subsequence includes: acquiring a second predictive service data sequence corresponding to the historical service data sequence; segmenting the second predictive service data sequence to obtain second predictive service data subsequences; acquiring differences between the historical service data subsequences and the second predictive service data subsequences having a time correspondence as second subsequence differences; and acquiring, from the plurality of historical service data subsequences based on the second subsequence differences, the historical service data subsequence whose anomaly degree meets the anomaly degree condition as the abnormal service data subsequence.

The second predictive service data sequence refers to a service data sequence predicted through a prediction model. The second predictive service data sequence corresponding to the historical service data sequence means that the second predictive service data sequence and the historical service data sequence correspond to a same time period. The second predictive service data subsequence having a time correspondence means that a time period corresponding to the second predictive service data subsequence in the time cycle corresponds to a time period corresponding to the historical service data subsequence in the time cycle. That is, service data in the second predictive service data subsequence and service data in the historical service data subsequence correspond to a same cycle node.

In some embodiments, the computer device may acquire service data preceding the historical service data sequence as historical service data corresponding to the historical service data sequence, predict service data in a corresponding time period of the historical service data sequence based on a time series formed by the historical service data and a trained prediction model to obtain the second predictive service data sequence, then segment the second predictive service data sequence to obtain a plurality of second predictive service data subsequences, and acquire differences between the historical service data subsequences and the second predictive service data subsequences having a time correspondence to obtain corresponding second subsequence differences. The second subsequence differences are used for reflecting degrees of differences between the historical service data subsequences and the second predictive service data subsequences having a time correspondence. The greater the degree of difference, the more abnormal the historical service data subsequence.

In some embodiments, the computer device, after obtaining the second subsequence difference corresponding to each historical service data subsequence, determines whether the second subsequence difference is greater than a preset difference threshold, and if yes, determines that an anomaly degree of the historical service data subsequence meets the anomaly degree condition and takes the historical service data subsequence as an abnormal service data subsequence.

In some embodiments, the computer device segments the second predictive service data sequence, which may specifically be segmenting the second predictive service data sequence according to a time period. For example, it is assumed that the second predictive service data sequence is a time series obtained by arrangement of reference service data within three months. The second predictive service data sequence may be segmented into three reference service data subsequences on a monthly basis.

In some other embodiments, the segmenting, by the computer device, the second predictive service data sequence may specifically involve: acquiring a target time window, sliding the target time window on the second predictive service data sequence by taking a time node as a sliding unit, making reference service data in the target time window form the reference service data subsequences in chronological order, sliding the target time window on a predictive service data sequence by taking a time node as a sliding unit, and making predictive service data in the target time window form predictive service data subsequences in chronological order.

In some embodiments, the acquiring, by the computer device, differences between the historical service data subsequences and the second predictive service data subsequences having a time correspondence may specifically involve: calculating differences between service data in the historical service data subsequences and the second predictive service data subsequences under same time nodes, and summing and averaging all the differences, to obtain the differences between the historical service data subsequences and the second predictive service data subsequences.

In some embodiments, the second subsequence differences include third service data differences between historical service data and second predictive service data in time nodes, and the acquiring, from the plurality of historical service data subsequences based on the second subsequence differences, the historical service data subsequence whose anomaly degree meets the anomaly degree condition as the abnormal service data subsequence includes: comparing the third service data differences corresponding to the time nodes with a difference threshold to obtain comparison results; conducting statistics on a result quantity of the comparison results indicating that the third service data differences are greater than the difference threshold, and obtaining the anomaly degree quantization values corresponding to the historical service data subsequences based on the result quantity, the result quantity being positively correlated with the anomaly degree quantization values; and acquiring, based on the anomaly degree quantization values corresponding to the historical service data subsequences, the historical service data subsequence whose anomaly degree meets the anomaly degree condition as the abnormal service data subsequence.

The second predictive service data is service data in the second predictive service data sequence.

In some embodiments, the third service data differences between the historical service data and the second predictive service data may be calculated with reference to the following formula:

$$\delta_i = \left| \frac{s(t+i) - \tilde{s}(t+i)}{s(t+i)} \right| \tag{3}$$

where $s(t+i)$ denotes the historical service data, $\tilde{s}(t+i)$ denotes the second predictive service data, and $\delta_i$ denotes the third service data difference.

The computer device compares the third service data differences corresponding to the time nodes with the difference threshold to obtain comparison results. The comparison results include being greater than the difference threshold and being less than the difference threshold. The computer device may conduct statistics on the result quantity of the comparison results indicating that the third service data differences are greater than the difference threshold. In some embodiments, the computer device may conduct statistics on the result quantity of the comparison results indicating that the third service data differences are greater than the difference threshold with reference to the following formula:

$$\Sigma 1(\delta_i \geq \delta_0) \tag{4}$$

where $1(\delta_i \geq \delta_0)$ indicates that when $\delta_i \geq \delta_0$, the count is 1, and otherwise is 0.

In some embodiments, after obtaining the result quantity by statistics, the computer device may take the result quantity as the anomaly degree quantization value corresponding to the historical service data subsequence. In other embodiments, the computer device may preset a plurality of result quantity ranges. A corresponding anomaly degree quantization value is set for each result quantity range. After obtaining the result quantity by statistics, the computer device determines the result quantity range to which the result quantity belongs, and determines the anomaly degree quantization value corresponding to the result quantity range to be the anomaly degree quantization value corresponding to the historical service data subsequence.

The computer device further determines whether the anomaly degree quantization value corresponding to each historical service data subsequence is greater than the anomaly degree threshold, and if yes, determines that the historical service data subsequence meets the anomaly degree condition and takes the historical service data subsequence as the abnormal service data subsequence.

In the above embodiment, the abnormal service data subsequence can be quickly obtained by acquiring and segmenting the second predictive service data sequence, acquiring differences between the historical service data subsequences and the second predictive service data subsequences having a time correspondence as second subsequence differences, and obtaining the abnormal service data subsequence based on the second subsequence differences.

In some embodiments, the determining target service data based on the historical service data sequence and the scenario influence value sequence includes: acquiring historical time nodes corresponding to the historical service data, and acquiring historical events corresponding to the historical time nodes; acquiring event features corresponding to the historical events as historical event features corresponding to the historical service data; arranging the historical event features corresponding to the historical service data in chronological order to obtain an event feature sequence; and determining the target service data based on the event feature sequence, the historical service data sequence, and the scenario influence value sequence.

The historical events corresponding to the historical time nodes refer to events receiving more attention than a preset attention threshold and transmitted at the corresponding time of the historical time nodes. The event features corresponding to the historical events refer to features of news text of the historical events, which may be obtained by extracting keywords from the news text.

In some embodiments, for each piece of historical service data in the historical service data sequence, the computer device acquires a historical time node corresponding to the historical service data, acquires news events in corresponding time of the historical time node from the Internet, acquires news text of historical events receiving more attention than a preset attention threshold, extracts keywords from the news text as a historical event feature corresponding to the historical service data, arranges historical event features corresponding to the historical service data in chronological order to obtain an event feature sequence, and takes the event feature sequence and the scenario influence value sequence as an additional feature of the prediction model. The prediction model performs prediction based on the features extracted from the historical service data sequence and the additional feature to obtain the target service data in the target time period.

In some embodiments, the target service data obtained by adding the event feature sequence as the additional feature in combination with the event feature sequence, the historical service data sequence, and the scenario influence value sequence is more accurate.

In some embodiments, the acquiring a historical service data sequence includes: acquiring historical resource transfer data corresponding to a target service object in historical service time, and arranging the historical resource transfer data in chronological order to obtain a historical resource transfer data sequence corresponding to the target service object as the historical service data sequence; and the determining target service data based on the historical service data sequence and the scenario influence value sequence includes: obtaining a target resource transfer data sequence of the target service object in a target time period based on the historical resource transfer data sequence and the scenario influence value sequence; and obtaining resource strategy prompt information of the target service object for the target time period based on the target resource transfer data sequence.

The target service object refers to an object that can provide a resource storage service. The target service object may specifically be a bank.

In some embodiments, the computer device may acquire historical resource transfer data of the target service object for a target service in historical service time, and arrange the historical resource transfer data in chronological order to obtain a historical resource transfer data sequence corresponding to the target service object as a historical service data sequence. The computer device may then obtain a scenario influence value sequence through the operations in the above embodiment, and predict a resource transfer data sequence of the target service object in the target time period based on the historical resource transfer data sequence and the scenario influence value sequence to obtain a target resource transfer data sequence.

In some embodiments, the computer device may conduct statistics on target resource transfer data in the target resource transfer data sequence to obtain a quantity of resources required by the target service object in the target time period, and generate resource strategy prompt information based on the quantity of resources. The resource strategy prompt information is used for prompting the target service object to perform storage so as to provide a sufficient quantity of resources in the target time period. The computer device may further transmit the resource strategy prompt information to a computer device corresponding to the target service object.

Figure 7:
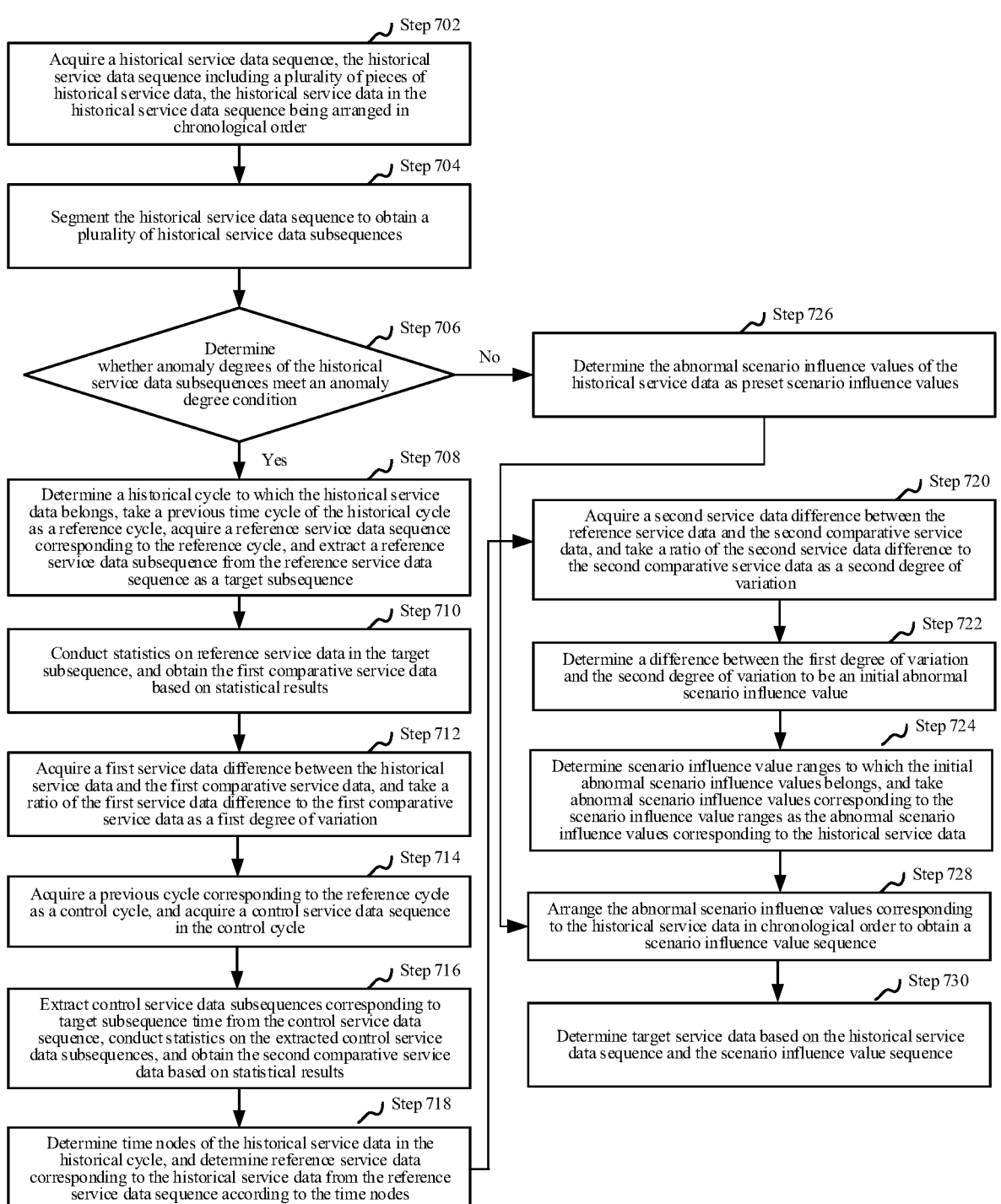
FIG. 7 is a schematic flowchart of a service data processing method according to some embodiments.

In some specific embodiments, as shown in FIG. 7, a service data processing method is provided, including the following operations:

Operation 702: Acquire a historical service data sequence, the historical service data sequence including a plurality of pieces of historical service data, the historical service data in the historical service data sequence being arranged in chronological order.

Operation 704: Segment the historical service data sequence to obtain a plurality of historical service data subsequences.

Operation 706: Determine whether anomaly degrees of the historical service data subsequences meet an anomaly degree condition, and perform operation 708 if yes. Operation 726 is performed if not.

In some embodiments, the second predictive service data sequence corresponding to the historical service data sequence is acquired, the historical service data sequence and the second predictive service data sequence are segmented to obtain a plurality of historical service data subsequences corresponding to the historical service data sequence and second predictive service data subsequences, differences between the historical service data subsequences and the second predictive service data subsequences having a time correspondence are acquired as second subsequence differences, and the historical service data subsequence whose anomaly degree meets the anomaly degree condition is acquired from the plurality of historical service data subsequences based on the second subsequence differences as the abnormal service data subsequence.

Operation 708: Determine a historical cycle to which the historical service data belongs, take a previous time cycle of the historical cycle as a reference cycle, acquire a reference service data sequence corresponding to the reference cycle, and extract a reference service data subsequence from the reference service data sequence as a target subsequence.

In some embodiments, the computer device acquires a first predictive service data sequence corresponding to the reference service data sequence, segment the reference service data sequence and the first predictive service data sequence to obtain a plurality of reference service data subsequences corresponding to the reference service data sequence and a plurality of first predictive service data subsequences corresponding to the first predictive service data sequence, acquires differences between the reference service data subsequences and the first predictive service data subsequences having a time correspondence as first subsequence differences, and acquires, from the plurality of reference service data subsequences based on the first subsequence differences, the reference service data subsequence whose prediction accuracy meets an accuracy condition as the target subsequence.

Operation 710: Conduct statistics on reference service data in the target subsequence, and obtain the first comparative service data based on statistical results.

Operation 712: Acquire a first service data difference between the historical service data and the first comparative service data, and take a ratio of the first service data difference to the first comparative service data as a first degree of variation.

Operation 714: Acquire a previous cycle corresponding to the reference cycle as a control cycle, and acquire a control service data sequence in the control cycle.

Operation 716: Extract control service data subsequences corresponding to target subsequence time from the control service data sequence, conduct statistics on the extracted control service data subsequences, and obtain the second comparative service data based on statistical results.

Operation 718: Determine time nodes of the historical service data in the historical cycle, and determine reference service data corresponding to the historical service data from the reference service data sequence according to the time nodes.

Operation 720: Acquire a second service data difference between the reference service data and the second comparative service data, and take a ratio of the second service data difference to the second comparative service data as a second degree of variation.

Operation 722: Determine a difference between the first degree of variation and the second degree of variation to be an initial abnormal scenario influence value.

Operation 724: Determine scenario influence value ranges to which the initial abnormal scenario influence values belongs, and take abnormal scenario influence values corresponding to the scenario influence value ranges as the abnormal scenario influence values corresponding to the historical service data.

The abnormal scenario influence values are positively correlated with values corresponding to the scenario influence value ranges.

Operation 726: Determine the abnormal scenario influence values of the historical service data as preset scenario influence values.

The preset scenario influence values are less than the abnormal scenario influence values obtained based on the first service data difference and the reference data difference.

Operation 728: Arrange the abnormal scenario influence values corresponding to the historical service data in chronological order to obtain a scenario influence value sequence.

Operation 730: Determine target service data based on the historical service data sequence and the scenario influence value sequence.

In an application scenario according to some embodiments, a long cycle of a transaction is predicted, so as to reserve funds required by corresponding products in advance to prevent liquidity risks in financial services. For example, prediction of a size of a transaction to be disbursed in next three or six months can remind relevant banks to keep liquidity reserves in place to meet future service needs. In some embodiments, the service data processing method may be applied as follows:

1. Daily transaction amounts of an installment service of a target bank in the past year are acquired, and transactions are arranged in chronological order to form a time series to obtain a historical transaction amount sequence.

2. A trained time series prediction model is acquired, and a predicted transaction amount sequence in a future target period of time is predicted through the time series prediction model.

The time series prediction model may be, for example, a prophet model, an LSTM model, an xbgoost model, or the like. The target time period may be determined as required, which may be, for example, three months, six months, or the like. The predicted transaction amount sequence refers to a time series obtained by arranging daily predicted transaction amounts in chronological order in the target time period.

3. The historical transaction amount sequence and the predicted transaction amount sequence are respectively segmented to obtain a plurality of historical transaction amount subsequences corresponding to the historical transaction amount sequence and a plurality of predicted transaction amount subsequences corresponding to the predicted transaction amount sequence.

4. Operation 4.1 to operation 4.3 below are performed to determine whether each historical transaction amount subsequence is an abnormal historical transaction amount subsequence.

4.1. The historical transaction amount subsequence and the predicted transaction amount subsequence having a time correspondence form a subsequence pair. In the subsequence pair, differences between historical transaction amounts and predicted transaction amounts corresponding to a same day, the differences are compared with the historical transaction amounts to obtain service data differences corresponding to the day, and the service data differences are compared with a difference threshold to obtain comparison results.

4.2. Statistics is conducted on a result quantity of the comparison results indicating that the service data differences are greater than the difference threshold, and an anomaly degree quantization value corresponding to the historical transaction amount subsequence is obtained based on the result quantity.

It should be noted that the service data differences in operation 4.1 may be obtained with reference to the above formula (3), and the quantity of statistical results in operation 4.2 may be obtained with reference to the formula (4) in the above embodiment.

4.3. It is determined whether the anomaly degree quantization value corresponding to the historical transaction amount subsequence is greater than an anomaly degree threshold. The historical transaction amount subsequence is determined to be an abnormal historical transaction amount subsequence if yes, and determined to be a non-abnormal historical transaction amount subsequence if not.

A time period corresponding to the abnormal historical transaction amount subsequence is a time period corresponding to an abnormal scenario.

5. A time cycle in the application scenario is a month. Therefore, operation 6 is performed for each historical transaction amount in the abnormal historical transaction amount subsequence, while operation 12 is performed for each historical transaction amount in the non-abnormal historical transaction amount subsequence.

6. A month to which the historical transaction amount belongs is determined, a month preceding the month is determined to be a reference month, a target subsequence is selected in the reference month, and transaction amounts in the target subsequence are averaged to obtain a first comparative transaction amount.

The target subsequence may be selected through operation 6.1 to operation 6.4 below:

6.1. A reference transaction amount sequence corresponding to the reference month is acquired, and the reference transaction amount sequence is segmented to obtain a plurality of reference transaction amount subsequences.

6.2. A predicted transaction amount sequence corresponding to the reference month is predicted through a trained time series prediction model, and the predicted transaction amount sequence is segmented in a same manner to obtain a plurality of predicted transaction amount subsequences.

6.3. The reference transaction amount subsequences and the predicted transaction amount subsequences having a time correspondence form subsequence pairs, differences between reference transaction amounts and predicted transaction amounts on a same day in each subsequence pair are acquired, and an average value of the differences in the subsequence pair is calculated as a subsequence difference.

6.4. A time period corresponding to the subsequence with a minimum subsequence difference is determined to be a fixed time period corresponding to the reference month, and correspondingly, the reference transaction amount subsequence corresponding to the fixed time period is the target subsequence.

7. The first comparative transaction amount is successively subtracted from the historical transaction amounts to obtain first transaction amount differences.

8. A month preceding the reference month is determined to be a control month, a control transaction amount sequence corresponding to the control month is acquired, a target transaction amount subsequence in a time period corresponding to the target subsequence is determined from the control transaction amount sequence, and transaction amounts in the transaction amount subsequence are averaged to obtain a second comparative transaction amount.

9. Time nodes (on a daily basis) in the month to which the historical transaction amount belongs are determined, a transaction amount of a same time node is acquired from the reference transaction amount sequence as a target reference transaction amount, and the second comparative transaction amount is subtracted from the target reference transaction amount to obtain a reference transaction amount difference.

10. An auto-correlation influence function is constructed.

It is generally difficult to predict a time series of an abnormal scenario, and it is difficult to find correlation or perform direct assessment for influence on a target time series. For example, it is difficult to assess influence of a disease outbreak on prediction of a target time series, namely payment transactions. Therefore, the auto-correlation influence function is constructed to determine a relative degree of variation in this embodiment. A basic assumption is that comprehensive influence of an anomaly on the time series has been shown in the time series, so the auto-correlation influence function can be directly used to assess the anomaly. On this basis, in this embodiment, a first degree of variation of the historical transaction amount with respect to the first comparative transaction amount can be determined based on the first transaction amount difference and the first comparative transaction amount corresponding to the reference month, a second degree of variation of the target reference transaction amount with respect to the second comparative transaction amount can be determined based on the reference transaction amount difference and the second comparative transaction amount, and the relative degree of variation can be determined based on the first degree of variation and the second degree of variation. The relative degree of variation is taken as the abnormal scenario influence value of the historical transaction amount.

In some embodiments, the influence function shown by the following formula (5) or formula (6) may be constructed to determine the relative degree of variation:

$$e_{p,t} = \frac{s_t^p - s_{T_0}^{p-1}}{s_{T_0}^{p-1}} - \frac{s_t^{p-1} - s_{T_0}^{p-2}}{s_{T_0}^{p-2}} \tag{5}$$

where $$s_t^p$$

denotes the historical transaction amount, $$s_{T_0}^{p-1}$$

denotes the first comparative transaction amount, $$s_t^p - s_{T_0}^{p-1}$$

represents the first transaction amount difference, $$s_t^{p-1}$$

denotes the reference transaction amount, $$s_{T_0}^{p-2}$$

denotes the second comparative transaction amount, $$s_t^{p-1} - s_{T_0}^{p-2}$$

represents the reference transaction amount difference, $e_{p,t}$ denotes the abnormal scenario influence value, $$\frac{s_t^p - s_{T_0}^{p-1}}{s_{T_0}^{p-1}}$$

represents the first degree of variation, and $$\frac{s_t^{p-1} - s_{T_0}^{p-2}}{s_{T_0}^{p-2}}$$

represents the second degree of variation.

$$e_{p,t} = \left( \frac{s_t^p - s_{T_0}^{p-1}}{s_{T_0}^{p-1}} \right) \bigg/ \left( \frac{s_t^{p-1} - s_{T_0}^{p-2}}{s_{T_0}^{p-2}} \right) \tag{6}$$

11. A piecewise influence function is constructed.

In actual time series prediction, it is not good to directly add the abnormal scenario influence value calculated based on the influence function to the prediction model, which may lead to great fluctuations in prediction results of the model. Therefore, the piecewise influence function is further constructed on the basis of operation 10 to obtain a final abnormal scenario influence value. Physically, influence of different abnormal scenarios on a target transaction amount sequence is not to directly assess quantitative prediction results, but segmenting influence results. For example, influence of a disease outbreak on the transaction amount sequence is not to be quantified and fitted, but to assess an influence size, which may gradually become smaller with weakening of a development trend of the disease. A piecewise function may be constructed with reference to the following formula (7):

$$l(t) = \mathcal{H}(e_{p,t}) \tag{7}$$

where $\mathcal{H}(e_{p,t})$ denotes a transformation function, which transforms a continuous function into a piecewise function. A possible form may be obtained with reference to the following formula (8) (an example only):

$$\mathcal{H}(e_{p,t}) = \begin{cases} 1, & e_0 \le e_{p,t} < e_1 \\ 2, & e_1 \le e_{p,t} < e_2 \end{cases} \tag{8}$$

12. For each historical transaction amount in the non-abnormal historical transaction amount subsequence, the abnormal scenario influence value corresponding to the historical transaction amount is set to 0.

13. The abnormal scenario influence values of the historical transaction amounts in the historical transaction amount sequence are arranged in chronological order to obtain a scenario influence value sequence, the scenario influence value sequence is added to the time series prediction model as a feature, and the time series prediction model performs prediction based on the historical service data sequence and the scenario influence value sequence to obtain a target transaction amount sequence in the target time period.

The time series prediction model may specifically be a prophet model. The model may be specifically obtained with reference to the above formula (1) and formula (2). The time series prediction model may also be an xbgoost model, an LSTM model, or the like.

Figure 8:
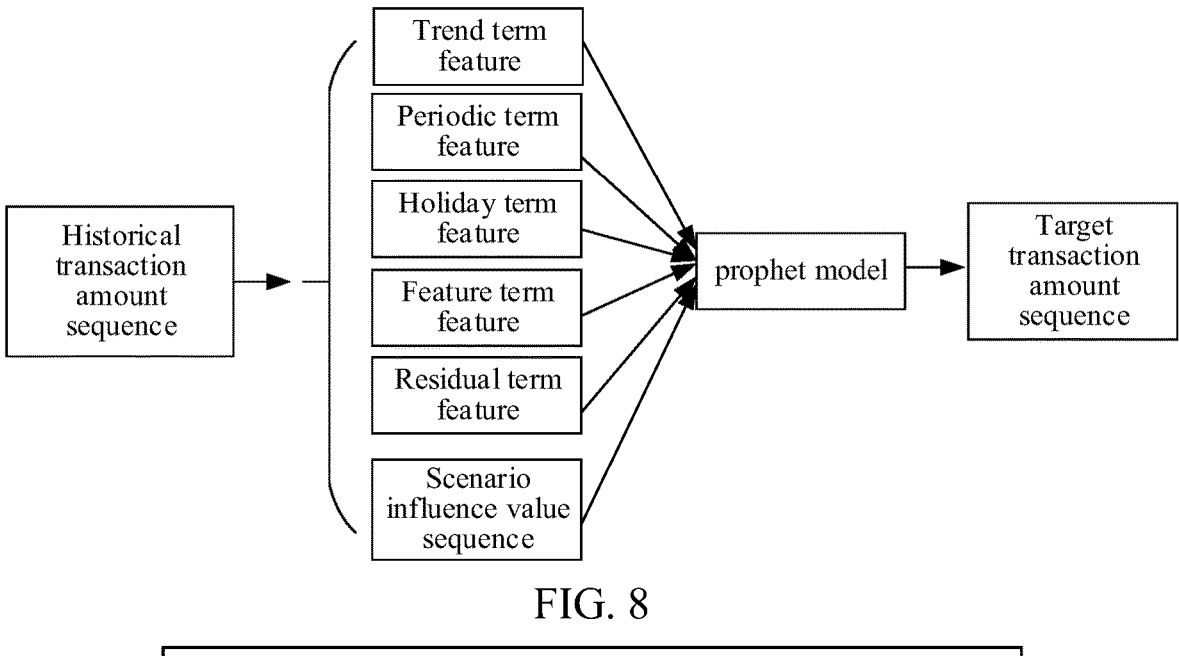
FIG. 8 is a schematic diagram of a prediction process of a time series prediction model according to some embodiments.

FIG. 8 shows a schematic diagram of a prediction process of a time series prediction model according to some embodiments. Referring to FIG. 8, the computer device extracts a periodic term feature, a trend term feature, a holiday term feature, a feature term feature, and a residual term feature, and inputs the periodic term feature, the trend term feature, the holiday term feature, the feature term feature, the residual term feature, and the scenario influence value sequence together into the prophet model to obtain the target transaction amount sequence by prediction.

In some embodiments, historical payment data of a third-party payment platform cooperating with banks is arranged in chronological order to obtain a historical service data sequence. The computer device then obtains an abnormal influence value sequence based on the historical service data sequence, and finally predicts a payment data sequence in a future long cycle (such as six months or one year) based on the historical service data sequence and the abnormal influence value sequence. Then, transaction prediction may be performed on the bank to determine service strategies, products, and operation plans of the banks. Further, future transaction sizes of the banks may be determined based on the payment data sequence of the third-party payment platform, and reasonable rates are determined for the banks or payment institutions according to the transaction scales, in order to promote rapid development of the industry. At the same time, reasonable product operation strategies are formulated for cooperative banks, which helps the banks improve service quality and level for better development.

It is to be understood that although each operation of the flowcharts in FIG. 2 to FIG. 7 is displayed sequentially according to arrows, the operations are not necessarily performed according to an order indicated by arrows. Unless otherwise clearly specified in this specification, the operations are performed without any strict sequence limit, and may be performed in other sequences. Moreover, at least some of the operations in FIG. 2 to FIG. 7 may include a plurality of operations or a plurality of stages. These operations or stages are not necessarily performed at the same moment, but may be performed at different moments. These operations or stages are not necessarily executed sequentially, but may be performed in turn or alternately with other operations or at least some of operations or stages of the other operations.

Figure 9:
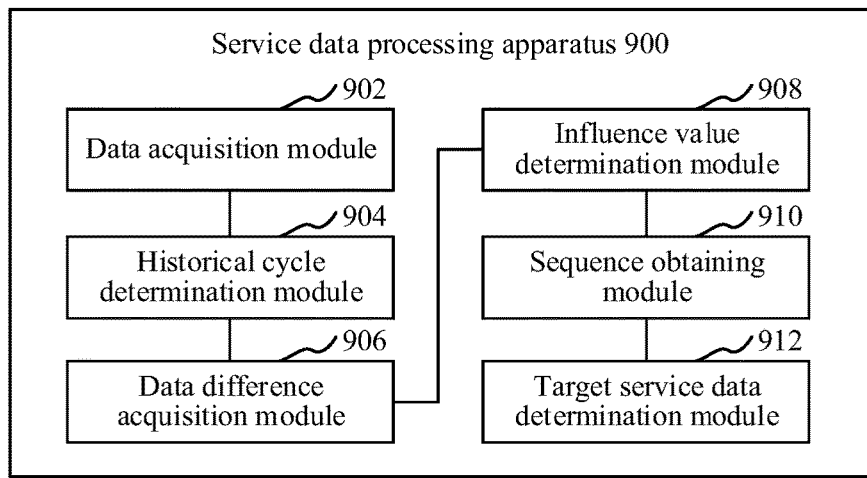
FIG. 9 is a structural block diagram of a service data processing apparatus according to some embodiments.

In some embodiments, as shown in FIG. 9, a service data processing apparatus 900 is provided. The apparatus may be a software module or a hardware module, or a combination of both, and becomes a part of a computer device. The apparatus may include:

a data acquisition module 902 configured to acquire a historical service data sequence, the historical service data sequence including a plurality of pieces of historical service data, the historical service data in the historical service data sequence being arranged in chronological order;

a historical cycle determination module 904 configured to determine a historical cycle to which the historical service data belongs, acquire a reference service data sequence in a reference cycle corresponding to the historical cycle, and obtain first comparative service data based on the reference service data sequence;

a data difference acquisition module 906 configured to acquire a first service data difference between the historical service data and the first comparative service data;

an influence value determination module 908 configured to acquire a reference data difference, and determine abnormal scenario influence values corresponding to the historical service data based on the first service data difference and the reference data difference;

a sequence obtaining module 910 configured to arrange the abnormal scenario influence values corresponding to the historical service data in chronological order to obtain a scenario influence value sequence; and a target service data determination module 912 configured to determine target service data based on the historical service data sequence and the scenario influence value sequence.

In some embodiments, the target service data is predicted by determining a historical cycle to which historical service data in a historical service data sequence belongs, acquiring a reference service data sequence in a reference cycle corresponding to the historical cycle, obtaining first comparative service data based on the reference service data sequence, acquiring a first service data difference between the historical service data and the first comparative service data, acquiring a reference data difference, determining abnormal scenario influence values corresponding to the historical service data based on the first service data difference and the reference data difference, arranging the abnormal scenario influence values corresponding to the historical service data in chronological order to obtain a scenario influence value sequence, and determining the target service data based on the historical service data sequence and the scenario influence value sequence. The scenario influence value sequence may assess influence of an abnormal scenario on the service data and reflect a degree of influence of the abnormal scenario on the service data. Therefore, in the determination of the target service data, the influence of the historical service data sequence and the abnormal scenario on the service data may be comprehensively considered, which improves accuracy of prediction of the target service data.

In some embodiments, the historical cycle determination module is further configured to acquire the reference service data sequence corresponding to the reference cycle, and segment the reference service data sequence to obtain a plurality of reference service data subsequences; acquire, from the plurality of reference service data subsequences, the reference service data subsequence whose prediction accuracy meets an accuracy condition as a target subsequence; and conduct statistics on reference service data in the target subsequence, and obtain the first comparative service data based on statistical results.

In some embodiments, the historical cycle determination module is further configured to acquire a first predictive service data sequence corresponding to the reference service data sequence; segment the first predictive service data sequence to obtain first predictive service data subsequences; acquire differences between the reference service data subsequences and the first predictive service data subsequences having a time correspondence as first subsequence differences; and acquire, from the plurality of reference service data subsequences based on the first subsequence differences, the reference service data subsequence whose prediction accuracy meets the accuracy condition as the target subsequence.

In some embodiments, the influence value determination module is further configured to acquire a forward cycle corresponding to the reference cycle as a control cycle; acquire a control service data sequence in the control cycle, and obtain second comparative service data based on the control service data sequence; determine time nodes of the historical service data in the historical cycle, and determine reference service data corresponding to the historical service data from the reference service data sequence according to the time nodes; and acquire a second service data difference between the reference service data and the second comparative service data, and take the second service data difference as the reference data difference.

In some embodiments, the influence value determination module is further configured to: determine a first degree of variation of the historical service data with respect to the first comparative service data based on the first service data difference and the first comparative service data; determine a second degree of variation of the reference service data with respect to the second comparative service data based on the reference data difference and the second comparative service data; and determine a relative degree of variation based on the first degree of variation and the second degree of variation, and determining the abnormal scenario influence values corresponding to the historical service data based on the relative degree of variation.

In some embodiments, the influence value determination module is further configured to: acquire a difference between the first degree of variation and the second degree of variation, and take the difference as the relative degree of variation; or acquire a ratio of the first degree of variation to the second degree of variation, and take the ratio as the relative degree of variation.

In some embodiments, the influence value determination module is further configured to: determine initial abnormal scenario influence values corresponding to the historical service data based on the first service data difference and the reference data difference; and determine scenario influence value ranges to which the initial abnormal scenario influence values belongs, and take abnormal scenario influence values corresponding to the scenario influence value ranges as the abnormal scenario influence values corresponding to the historical service data, the abnormal scenario influence values being positively correlated with values corresponding to the scenario influence value ranges.

In some embodiments, the apparatus further includes: a segmentation module configured to segment the historical service data sequence to obtain a plurality of historical service data subsequences; acquire, from the plurality of historical service data subsequences, the historical service data subsequence whose anomaly degree quantization value meets an anomaly degree condition as an abnormal service data subsequence; perform, in a case that the historical service data belongs to the abnormal service data subsequence, the operation of determining a historical cycle to which the historical service data belongs, acquiring a reference service data sequence in a reference cycle corresponding to the historical cycle; and otherwise, determine abnormal scenario influence values of the historical service data as preset scenario influence values, the preset scenario influence values being less than the abnormal scenario influence values obtained based on the first service data difference and the reference data difference.

In some embodiments, the segmentation module is configured to acquire a second predictive service data sequence corresponding to the historical service data sequence; segment the second predictive service data sequence to obtain second predictive service data subsequences; acquire differences between the historical service data subsequences and the second predictive service data subsequences having a time correspondence as second subsequence differences; and acquire, from the plurality of historical service data subsequences based on the second subsequence differences, the historical service data subsequence whose anomaly degree meets the anomaly degree condition as the abnormal service data subsequence.

In some embodiments, the second subsequence differences include third service data differences between historical service data and second predictive service data in time nodes, and the segmentation module is further configured to: compare the third service data differences corresponding to the time nodes with a difference threshold to obtain comparison results; conduct statistics on a result quantity of the comparison results indicating that the third service data differences are greater than the difference threshold, and obtain the anomaly degree quantization values corresponding to the historical service data subsequences based on the result quantity, the result quantity being positively correlated with the anomaly degree quantization values; and acquire, based on the anomaly degree quantization values corresponding to the historical service data subsequences, the historical service data subsequence whose anomaly degree meets the anomaly degree condition as the abnormal service data subsequence.

In some embodiments, the target service data determination module is further configured to acquire historical time nodes corresponding to the historical service data, and acquire historical events corresponding to the historical time nodes; acquire event features corresponding to the historical events as historical event features corresponding to the historical service data; arrange the historical event features corresponding to the historical service data in chronological order to obtain an event feature sequence; and determine the target service data based on the event feature sequence, the historical service data sequence, and the scenario influence value sequence.

In some embodiments, the data acquisition module is further configured to acquire historical resource transfer data corresponding to a target service object in historical service time, and arrange the historical resource transfer data in chronological order to obtain a historical resource transfer data sequence corresponding to the target service object as the historical service data sequence; and the target service data determination module is further configured to obtain a target resource transfer data sequence of the target service object in a target time period based on the historical resource transfer data sequence and the scenario influence value sequence; and obtain resource strategy prompt information of the target service object for the target time period based on the target resource transfer data sequence.

For a specific limitation on the service data processing apparatus, reference is made to the limitation on the service data processing method above, and details are not described herein again. The modules in the service data processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to the foregoing modules.

In some embodiments, a computer device is provided. The computer device may be a server, and an internal structure diagram thereof may be shown in FIG. 10. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store service data processing data. The network interface of the computer device is configured to connect to and communicate with an external terminal by using a network. The computer program is executed by the processor to implement a service data processing method.

Figure 10:
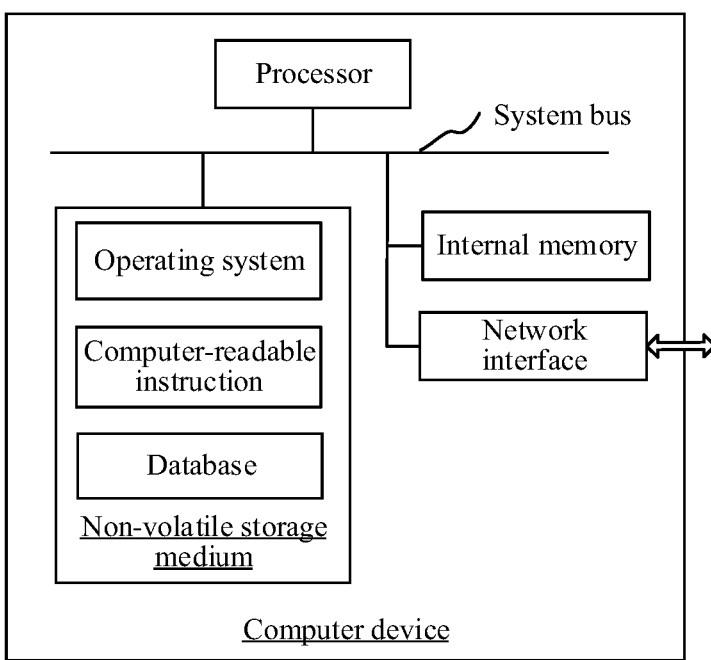
FIG. 10 is a diagram of an internal structure of a computer device according to some embodiments.

A person skilled in the art may understand that the structure shown in FIG. 10 is only a block diagram of a part of a structure related to a solution of some embodiments and does not limit the computer device to which the solution is applied. In some embodiments, the computer device may include more or fewer components than those shown in the figure, or some components may be combined, or a different component deployment may be used.

In some embodiments, a computer device is further provided, including a memory and a processor, the memory storing computer-readable instructions, the computer-readable instructions, when executed by the processor, causing the processor to perform the operations of the foregoing method embodiments.

In some embodiments, one or more non-volatile readable storage medium are provided, storing computer-readable instructions, the computer-readable instructions, when executed by one or more processors, causing the processors to perform the operations of the foregoing method embodiments.

In some embodiments, a computer program product is provided, including computer-readable instructions, the computer-readable instructions, when executed by a processor, implementing the operations of the foregoing method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in some embodiments may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the disclosure, which are described specifically and in detail, but cannot be construed as a limitation to the patent scope of the present disclosure. It should be noted that for a person of ordinary skill in the art, several transformations and improvements can be made without departing from the idea of the disclosure. These transformations and improvements fall within the protection scope of the disclosure. Therefore, the protection scope of the patent of the disclosure shall be subject to the appended claims.

What is claimed is:

1. A service data processing method, performed by a computer device, the service data processing method comprising:
   acquiring a historical service data sequence including historical service data arranged in chronological order;
   determining a historical cycle to which the historical service data belongs, acquiring a reference service data sequence in a reference cycle corresponding to the historical cycle, and obtaining first comparative service data based on the reference service data sequence;
   acquiring a first service data difference between the historical service data and the first comparative service data;
   acquiring a reference data difference, and determining abnormal scenario influence values corresponding to the historical service data based on the first service data difference and the reference data difference;
   arranging the abnormal scenario influence values corresponding to the historical service data in chronological order to obtain a scenario influence value sequence;
   determining target service data based on the historical service data sequence and the scenario influence value sequence;
   encrypting the target service data based on a preset key generation method;
   transmitting the encrypted target service data to a terminal; and
   determining the target service data to be correct based on decryption, by the terminal, of the encrypted target service data being completed successfully,
   wherein the acquiring the reference data difference comprises:
      acquiring a forward cycle corresponding to the reference cycle as a control cycle;
      acquiring a control service data sequence in the control cycle, and obtaining second comparative service data based on the control service data sequence; and
      acquiring a second service data difference between the reference service data and the second comparative service data, and taking the second service data difference as the reference data difference.

2. The service data processing method according to claim 1, wherein the acquiring the reference service data sequence comprises:
   acquiring the reference service data sequence corresponding to the reference cycle, and segmenting the reference service data sequence to obtain a plurality of reference service data subsequences;

31 acquiring, from the plurality of reference service data subsequences, a reference service data subsequence whose prediction accuracy meets an accuracy condition as a target subsequence; and conducting statistics on reference service data in the target subsequence, and obtaining the first comparative service data based on statistical results.

3. The service data processing method according to claim 2, wherein the acquiring the reference service data subsequence comprises:

acquiring a first predictive service data sequence corresponding to the reference service data sequence;

segmenting the first predictive service data sequence to obtain first predictive service data subsequences;

acquiring differences between the plurality of reference service data subsequences and the first predictive service data subsequences having a time correspondence as first subsequence differences; and acquiring, from the plurality of reference service data subsequences based on the first subsequence differences, the reference service data subsequence whose prediction accuracy meets the accuracy condition as the target subsequence.

4. The service data processing method according to claim 1, wherein the acquiring the reference data difference further comprises:

determining time nodes of the historical service data in the historical cycle, and determining reference service data corresponding to the historical service data from the reference service data sequence according to the time nodes.

5. The service data processing method according to claim 4, wherein the determining abnormal scenario influence values comprises:

determining a first degree of variation of the historical service data with respect to the first comparative service data based on the first service data difference and the first comparative service data;

determining a second degree of variation of the reference service data with respect to the second comparative service data based on the reference data difference and the second comparative service data; and determining a relative degree of variation based on the first degree of variation and the second degree of variation, and determining the abnormal scenario influence values corresponding to the historical service data based on the relative degree of variation.

6. The service data processing method according to claim 4, wherein the acquiring the control service data sequence comprises:

acquiring a target time period corresponding to the first comparative service data, and determining a control service data subsequence corresponding to the target time period from the control service data sequence; and conducting statistics on control service data in the control service data subsequence, and obtaining the second comparative service data based on statistical results.

7. The service data processing method according to claim 5, wherein the determining the relative degree of variation comprises:

acquiring a difference between the first degree of variation and the second degree of variation, and taking the difference as the relative degree of variation.

8. The service data processing method according to claim 5, wherein the determining the relative degree of variation comprises:

acquiring a ratio of the first degree of variation to the second degree of variation, and taking the ratio as the relative degree of variation.

9. The service data processing method according to claim 1, wherein the determining abnormal scenario influence values comprises:

determining initial abnormal scenario influence values corresponding to the historical service data based on the first service data difference and the reference data difference; and determining scenario influence value ranges to which the initial abnormal scenario influence values belong, and taking abnormal scenario influence values corresponding to the scenario influence value ranges as the abnormal scenario influence values corresponding to the historical service data, the abnormal scenario influence values being positively correlated with values corresponding to the scenario influence value ranges.

10. The service data processing method according to claim 1, further comprising:

segmenting the historical service data sequence to obtain a plurality of historical service data subsequences;

acquiring, from the plurality of historical service data subsequences, a historical service data subsequence whose anomaly degree quantization value meets an anomaly degree condition as an abnormal service data subsequence;

performing, when the historical service data belongs to the abnormal service data subsequence, an operation of determining the historical cycle to which the historical service data belongs, acquiring the reference service data sequence in the reference cycle corresponding to the historical cycle;

determining, when the historical service data does not belong to the abnormal service data subsequence, abnormal scenario influence values of the historical service data as preset scenario influence values, the preset scenario influence values being less than the abnormal scenario influence values obtained based on the first service data difference and the reference data difference.

11. The service data processing method according to claim 10, wherein the acquiring the historical service data subsequence comprises:

acquiring a second predictive service data sequence corresponding to the historical service data sequence;

segmenting the second predictive service data sequence to obtain second predictive service data subsequences;

acquiring differences between the plurality of historical service data subsequences and the second predictive service data subsequences having a time correspondence as second subsequence differences; and acquiring, from the plurality of historical service data subsequences based on the second subsequence differences, the historical service data subsequence whose anomaly degree quantization value meets the anomaly degree condition as the abnormal service data subsequence.

12. The service data processing method according to claim 11, wherein the second subsequence differences comprise third service data differences between the historical service data and second predictive service data in time nodes, and the acquiring the historical service data subsequence comprises:

comparing the third service data differences corresponding to the time nodes with a difference threshold to obtain comparison results;

conducting statistics on a result quantity of the comparison results indicating that the third service data differences are greater than the difference threshold, and obtaining the anomaly degree quantization values corresponding to the plurality of historical service data subsequences based on the result quantity, the result quantity being positively correlated with the anomaly degree quantization values; and acquiring, based on the anomaly degree quantization values corresponding to the plurality of historical service data subsequences, the historical service data subsequence whose anomaly degree quantization value meets the anomaly degree condition as the abnormal service data subsequence.

13. The service data processing method according to claim 1, wherein the determining target service data comprises:

acquiring historical time nodes corresponding to the historical service data, and acquiring historical events corresponding to the historical time nodes;

acquiring event features corresponding to the historical events as historical event features corresponding to the historical service data;

arranging the historical event features corresponding to the historical service data in chronological order to obtain an event feature sequence; and determining the target service data based on the event feature sequence, the historical service data sequence, and the scenario influence value sequence.

14. The service data processing method according to claim 1, wherein the acquiring the historical service data sequence comprises:

acquiring historical resource transfer data corresponding to a target service object in historical service time, and arranging the historical resource transfer data in chronological order to obtain a historical resource transfer data sequence corresponding to the target service object as the historical service data sequence; and the determining target service data based on the historical service data sequence and the scenario influence value sequence comprises:

obtaining a target resource transfer data sequence of the target service object in a target time period based on the historical resource transfer data sequence and the scenario influence value sequence; and obtaining resource strategy prompt information of the target service object for the target time period based on the target resource transfer data sequence.

15. A service data processing apparatus comprising:

at least one memory configured to store program code; and at least one processor configured to read the program code and operate as instructed by the program code, the program code comprising:

data acquisition code configured to cause at least one of the at least one processor to acquire a historical service data sequence including historical service data arranged in chronological order;

historical cycle determination code configured to cause at least one of the at least one processor to determine a historical cycle to which the historical service data belongs, acquire a reference service data sequence in a reference cycle corresponding to the historical cycle, and obtain first comparative service data based on the reference service data sequence;

data difference acquisition code configured to cause at least one of the at least one processor to acquire a first service data difference between the historical service data and the first comparative service data;

influence value determination code configured to cause at least one of the at least one processor to acquire a reference data difference, and determine abnormal scenario influence values corresponding to the historical service data based on the first service data difference and the reference data difference;

sequence obtaining code configured to cause at least one of the at least one processor to arrange the abnormal scenario influence values corresponding to the historical service data in chronological order to obtain a scenario influence value sequence;

target service data determination code configured to cause at least one of the at least one processor to determine target service data based on the historical service data sequence and the scenario influence value sequence; and further code configured to cause at least one of the at least one processor to:

encrypt the target service data based on a preset key generation method;

transmit the encrypted target service data to a terminal; and determine the target service data to be correct based on decryption, by the terminal, of the encrypted target service data being completed successfully, wherein the acquiring the reference data difference comprises:

acquiring a forward cycle corresponding to the reference cycle as a control cycle;

acquiring a control service data sequence in the control cycle, and obtaining second comparative service data based on the control service data sequence; and acquiring a second service data difference between the reference service data and the second comparative service data, and taking the second service data difference as the reference data difference.

16. The service data processing apparatus according to claim 15, wherein the historical cycle determination code is further configured to cause at least one of the at least one processor to:

acquire the reference service data sequence corresponding to the reference cycle, and segment the reference service data sequence to obtain a plurality of reference service data subsequences;

acquire, from the plurality of reference service data subsequences, a reference service data subsequence whose prediction accuracy meets an accuracy condition as a target subsequence; and conduct statistics on reference service data in the target subsequence, and obtain the first comparative service data based on statistical results.

17. The service data processing apparatus according to claim 16, wherein the historical cycle determination code is further configured to cause at least one of the at least one processor to:

acquire a first predictive service data sequence corresponding to the reference service data sequence;

segment the first predictive service data sequence to obtain first predictive service data subsequences;

acquire differences between the plurality of reference service data subsequences and the first predictive service data subsequences having a time correspondence as first subsequence differences; and acquire, from the plurality of reference service data subsequences based on the first subsequence differences, the reference service data subsequence whose prediction accuracy meets the accuracy condition as the target subsequence.

18. The service data processing apparatus according to claim 15, wherein the influence value determination code is further configured to cause at least one of the at least one processor to:

determine time nodes of the historical service data in the historical cycle, and determine reference service data corresponding to the historical service data from the reference service data sequence according to the time nodes.

19. The service data processing apparatus according to claim 18, wherein the influence value determination code is further configured to cause at least one of the at least one processor to:

determine a first degree of variation of the historical service data with respect to the first comparative service data based on the first service data difference and the first comparative service data;

determine a second degree of variation of the reference service data with respect to the second comparative service data based on the reference data difference and the second comparative service data; and determine a relative degree of variation based on the first degree of variation and the second degree of variation, and determine the abnormal scenario influence values corresponding to the historical service data based on the relative degree of variation.

20. A non-transitory computer-readable storage medium, storing computer code that, when executed by at least one processor, causes the at least one processor to at least:

acquire a historical service data sequence including historical service data arranged in chronological order;

determine a historical cycle to which the historical service data belongs, acquire a reference service data sequence in a reference cycle corresponding to the historical cycle, and obtain first comparative service data based on the reference service data sequence;

acquire a first service data difference between the historical service data and the first comparative service data;

acquire a reference data difference, and determine abnormal scenario influence values corresponding to the historical service data based on the first service data difference and the reference data difference;

arrange the abnormal scenario influence values corresponding to the historical service data in chronological order to obtain a scenario influence value sequence;

determine target service data based on the historical service data sequence and the scenario influence value sequence;

encrypt the target service data based on a preset key generation method;

transmit the encrypted target service data to a terminal; and determine the target service data to be correct based on decryption, by the terminal, of the encrypted target service data being completed successfully, wherein the acquiring the reference data difference comprises:

acquiring a forward cycle corresponding to the reference cycle as a control cycle;

acquiring a control service data sequence in the control cycle, and obtaining second comparative service data based on the control service data sequence; and acquiring a second service data difference between the reference service data and the second comparative service data, and taking the second service data difference as the reference data difference.

* * * * *